United States Patent
Kanou et al.

(10) Patent No.: US 7,632,110 B2
(45) Date of Patent: Dec. 15, 2009

(54) ELECTRIC JUNCTION BOX

(75) Inventors: Tomoki Kanou, Yokkaichi (JP); Tadashi Tomikawa, Yokkaichi (JP); Shinji Kawakita, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 103 days.

(21) Appl. No.: 11/791,746

(22) PCT Filed: Nov. 8, 2005

(86) PCT No.: PCT/JP2005/020474

§ 371 (c)(1),
(2), (4) Date: Jun. 20, 2007

(87) PCT Pub. No.: WO2006/057156

PCT Pub. Date: Jan. 6, 2006

(65) Prior Publication Data

US 2008/0009154 A1 Jan. 10, 2008

(30) Foreign Application Priority Data

Nov. 29, 2004 (JP) ............... 2004-344232
Nov. 29, 2004 (JP) ............... 2004-344233

(51) Int. Cl.
*H01R 12/00* (2006.01)
(52) U.S. Cl. ............... 439/76.2; 439/949; 361/704
(58) Field of Classification Search ............... 439/76.2, 439/949; 361/174, 704
See application file for complete search history.

(56) References Cited

U.S. PATENT DOCUMENTS

| 2003/0137813 A1 | 7/2003 | Onizuka et al. |
| 2004/0001319 A1 | 1/2004 | Kawakita et al. |
| 2004/0043647 A1* | 3/2004 | Takeuchi ............... 439/76.2 |
| 2004/0198080 A1* | 10/2004 | Kiyota ............... 439/76.2 |
| 2004/0223304 A1 | 11/2004 | Kobayashi et al. |
| 2005/0047095 A1* | 3/2005 | Tomikawa et al. ........... 361/715 |

FOREIGN PATENT DOCUMENTS

| JP | A 7-193942 | 7/1995 |
| JP | A 10-35375 | 2/1998 |
| JP | A 2003-164039 | 6/2003 |
| JP | A 2003-224918 | 8/2003 |
| JP | A-2004-39858 | 2/2004 |
| JP | A 2004-040873 | 2/2004 |
| JP | A 2004-248447 | 9/2004 |
| JP | A 2005-304105 | 10/2005 |

* cited by examiner

*Primary Examiner*—Hien Vu
(74) *Attorney, Agent, or Firm*—Oliff & Berridge, PLC

(57) ABSTRACT

A casing 20 surrounding a circuit structure 10 consists of a frame 21, a heat sink 30 located in a rear side of the circuit structure 10 and a cover 60 located in a front side. The frame 21 is in a two-component structure consisting of a first frame member 22 shaped a capital letter C and a second frame member 23 disposed in a rear side of a first terminal part 15A. Thereby, before implementing a switching member 13, the circuit structure 10 can be bonded to the heat sink 30 and, thereafter, the first frame member 22 and the second frame member 23 are separately fixed to the heat sink 30 so that the frame 21 surrounding the circuit structure 10 from the periphery can be completed.

13 Claims, 18 Drawing Sheets

ELECTRIC JUNCTION BOX

BACKGROUND OF THE INVENTION

1. Field of the Invention

The present invention relates to an electric junction box having an improved case structure.

2. Description of the prior art

For example, an electric junction box mounted on an automobile has a configuration in which a circuit structure, having an electric circuit formed on a substrate, is accommodated within a case. The circuit structure comprises, for example, a printed circuit board, a plurality of bus bars disposed on the rear side of the printed circuit board, and a switching element such as a relay, etc., mounted onto the front side of the printed circuit board. Terminal parts formed by bending the end portions of each bus bar protrude from the peripheral portion of the circuit board. The end portions thereof are covered with a housing. On the other hand, the case comprises a frame disposed so as to surround the circuit structure along the periphery of the circuit board, a heat sink fixed onto the frame so as to be in contact with the rear side of the circuit structure from the rear side of the frame, and a cover attached to the frame from the front side to cover the circuit structure. One of such electric junction boxes is disclosed in Japanese Laid-Open Patent No. 2003-164039.

One of such electric junction boxes may have a configuration in which a portion close to the tip of a bus bar is bent substantially perpendicular to the circuit board so as to rise up toward the front side, inside of the interior of the frame. A portion, closer to the tip side than the bending part, is further bent in a horizontal direction, substantially parallel to the circuit board, so as to be directed opposite to the substrate. The tip thereof serves as a terminal part. Those terminal parts are provided in the front side of the frame.

The electric junction box having such a configuration is assembled as follows. At first, a circuit structure, in which a switching element, etc., is mounted, is incorporated in the frame so as to be inserted inside of the frame from the front side thereof, in order to avoid interference between the terminal part and the frame. Thereafter, a heat sink is bonded onto the rear side of the bus bar and the rear side of the frame. Lastly a cover is incorporated onto the front side of the frame to cover the circuit structure.

The electric junction box is provided with a bus bar and is designed to dissipate heat, generated in the bus bar as a result of conduction, to the outside via the heat sink. In order to enhance the heat dissipation efficiency thereof, the tightness of the contact between the bus bar and the heat sink, which is present on the rear side of the circuit board, is required to be enhanced. And, in order to enhance the tightness of the contact, it may become necessary that a press jig, which is used to press the circuit board and the heat sink with an adhesive sandwiched therebetween, applies a pressure over a wide range on both sides of the circuit board so as to strongly bond the bus bar and the heat sink together over the wide range.

However, in the case where a circuit structure with switching elements, which are mounted onto the circuit board as described above, is bonded to the heat sink, it is impossible to bring the press jig into contact for bonding due to the switching elements. Therefore the press jig must press locally, such as among the sides of the circuit board, only at the regions where no switching elements are disposed. Accordingly, it is impossible to strongly bond the bus bar to the heat sink over a wide range, resulting in the possibility of a drop in the heat radiation efficiency.

On the other hand, in the case where the heat sink is bonded in advance onto the circuit board and the frame, and the switching elements or the like are then mounted onto the circuit board, the heat resistance of a frame, made of synthetic resin, for example, causes a limitation for these processes, such as not allowing reflow soldering to be used for mounting the switching elements.

The present invention was completed based on the circumstances as described above. An object thereof is to provide an electric junction box that can bring the bus bars and the heat sink into a tight contact with each other over a wide range.

SUMMARY OF THE INVENTION

A first invention of the present application is characterized in that a frame is disposed so as to surround a circuit structure about the periphery. The frame is configured by integrating a first frame member, disposed along the periphery of the circuit board in a region corresponding to terminal parts of a bus bar, and a second frame member, disposed along the periphery of the circuit board in a region corresponding to a lack of terminal parts of a bus bar.

In regard to the assembly of the electric junction box, this arrangement allows the heat sink to be bonded onto a bus bar and a circuit board in which no switching elements are mounted. At this stage, since no switching elements are mounted onto the circuit board, pressing over a wide range of the front side of the circuit board can achieve a firm bonding between the bus bar and the heat sink.

Further, the switching elements can then be mounted onto the circuit board in order to assemble a circuit structure. At this stage, since no frame is attached to the circuit structure, reflow soldering can be performed without being restricted by the heat resistance of a frame. Thereafter, a first frame member and a second frame member may be incorporated so as to surround the circuit structure and the heat sink around the periphery. Thereafter, a cover can be incorporated with the frame.

Therefore, according to the present invention, since the frame is configured with a first frame member and a second frame member, there are no restrictions that the frame must be incorporated from the rear side of a circuit structure in which switching elements have been mounted, prior to bonding with the heat sink. Rather, pressing the circuit board over a wide range prior to mounting the switching elements can achieve a firm bonding between the bus bar and the heat sink.

In addition, in the case of employing a frame with a configuration split into a first frame member and a second frame member, due to possible restrictions on shape and space etc., there may be a situation in which the frame is incorporated onto the heat sink by moving the first frame member and the second frame member in parallel along the plate surface of the heat sink. In this case, if the heat sink has been coated with a sealing agent, such as for sealing potential gaps with the frame member, the sealing agent can be removed due to the friction of the frame member moving during the incorporation. As a result, this would reduce the thickness of the sealing agent layer and consequently give rise to a concern that effective sealing will not be obtained.

Therefore, in a second invention, the frame consists of a first frame member fixed to the heat sink and a second frame member incorporated with the first frame member from a direction along the plate surface of the heat sink, thereby surrounding the circuit structure. Further, at least a part of the contact surface, where the second frame member on the heat sink is made to be a first sealing surface, has a higher topside in the direction of incorporation of the second frame member.

This limits the amount to a small quantity of the sealing agent, previously coated onto the first sealing surface, and removed by the friction of the second frame member at the time of incorporating the second member. As a result, the sealing agent layer is maintained at a required thickness, thereby achieving an enhanced sealing ability.

DETAILED DESCRIPTION OF THE PREFERRED EMBODIMENTS

Embodiments of the present invention will be described with reference to FIG. 1 through FIG. 18. An electric junction box of the present embodiment is mounted onto an automobile and is disposed between a battery (not shown) and electric components such as lamps, audio equipment, and the like (not shown). The electric junction box is used to distribute and supply the power provided by the battery to the respective electric components, and to control switching and the like of these power supplies.

Figure 1:
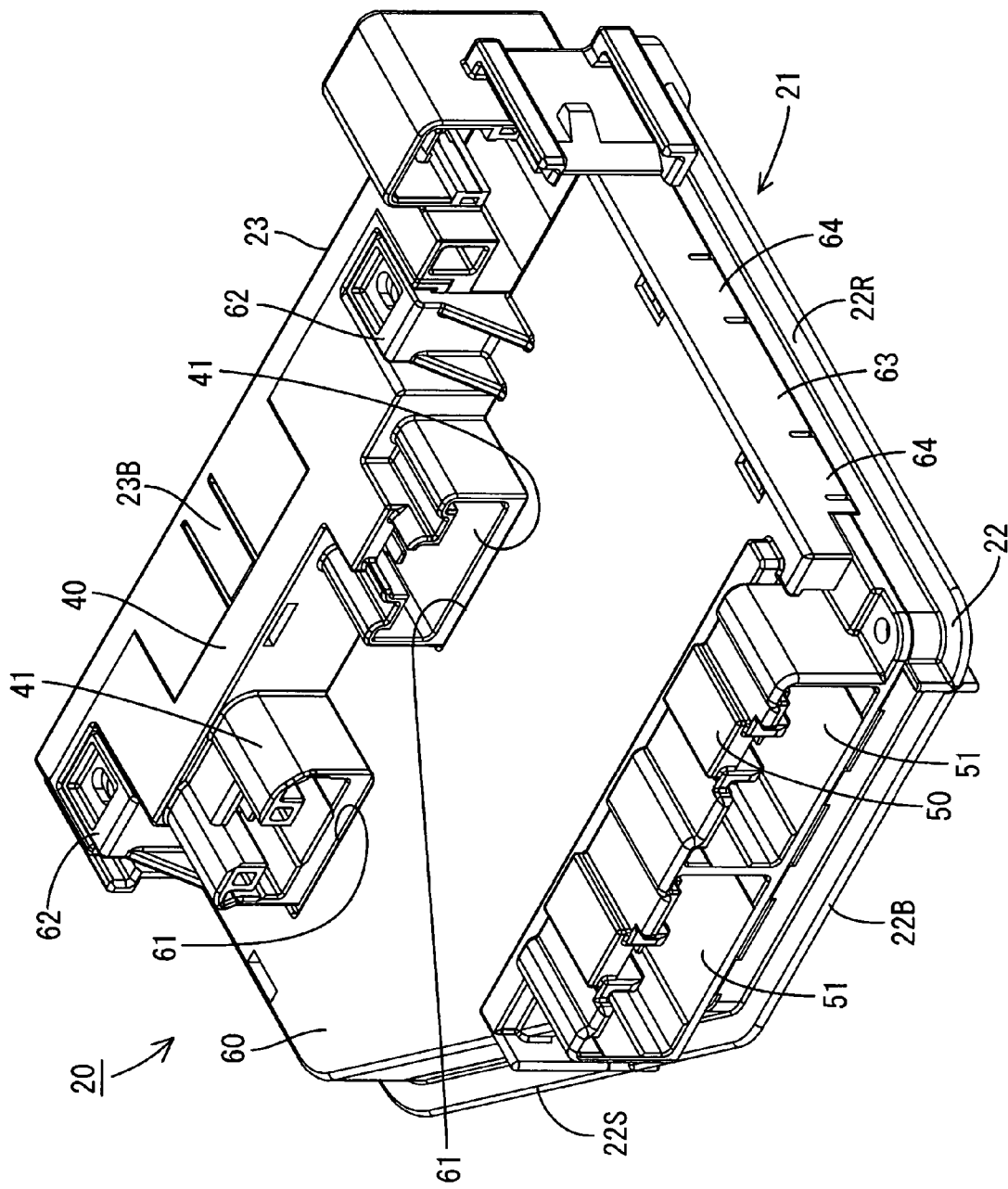
FIG. 1 is a perspective view of Embodiment 1.

Hereunder, referring to FIG. 1, respective configuring members will be described, with the front side (i.e., the side of the cover 60) shown at the front side of the drawing, the rear side (i.e., the side of the heat sink 30 not shown or visible in FIG. 1) at the rear side of the drawing, the bottom side at a lower side of the drawing (i.e., the side of frame part 22B), the top side at an upper side of the drawing (i.e., the side of frame member 23), the right side at the right side of the drawing (i.e., the side of frame part 22R), and the left side at the upper left side of the drawing. Here, in the drawing, the front side of the electric junction box is depicted so that the front side is directed upward, but when the electric junction box is mounted in an automobile or the like, it is installed in the automobile so that the top side in FIG. 1 is directed upward and the bottom side is directed downward.

The electric junction box comprises a circuit structure 10 (FIG. 2) and a casing 20 (FIG. 1) for accommodating the circuit structure 10.

Figure 2:
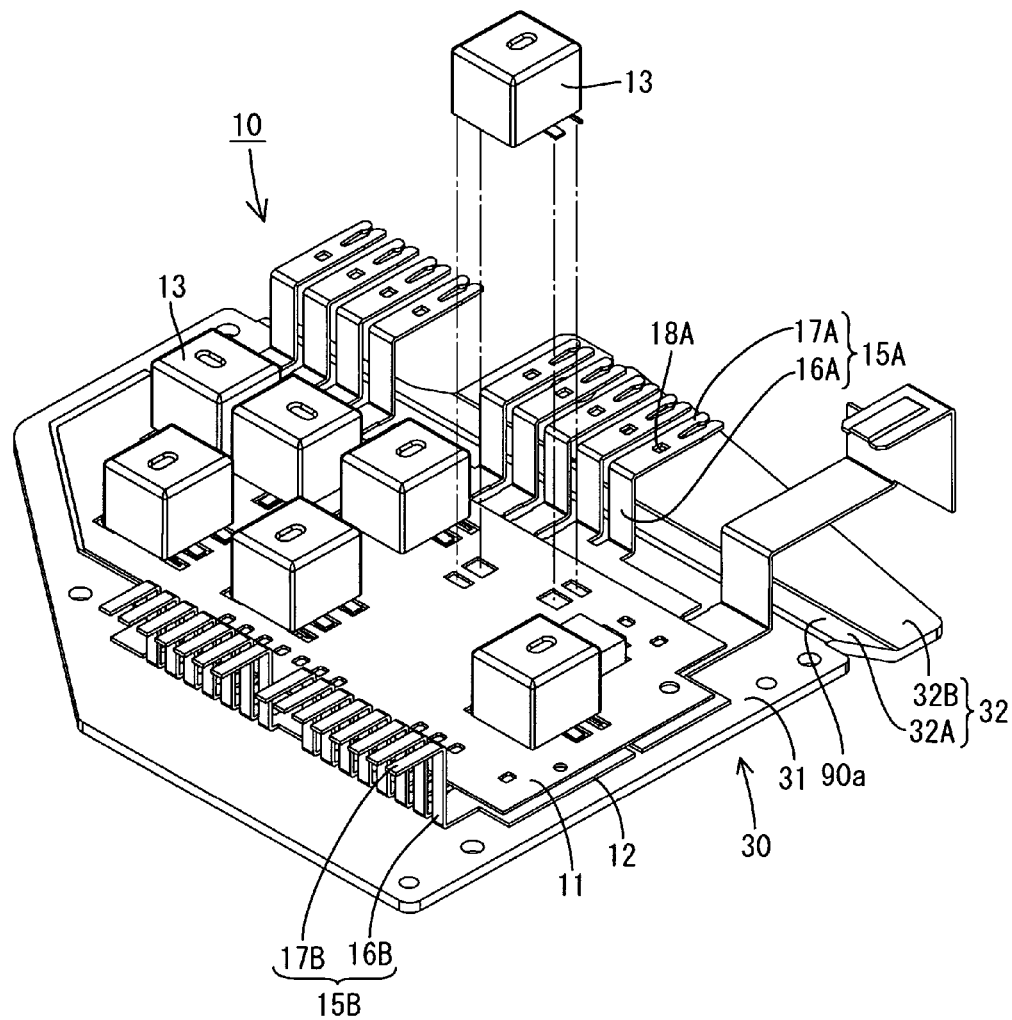
FIG. 2 is a perspective view of a circuit structure.
Figure 5:
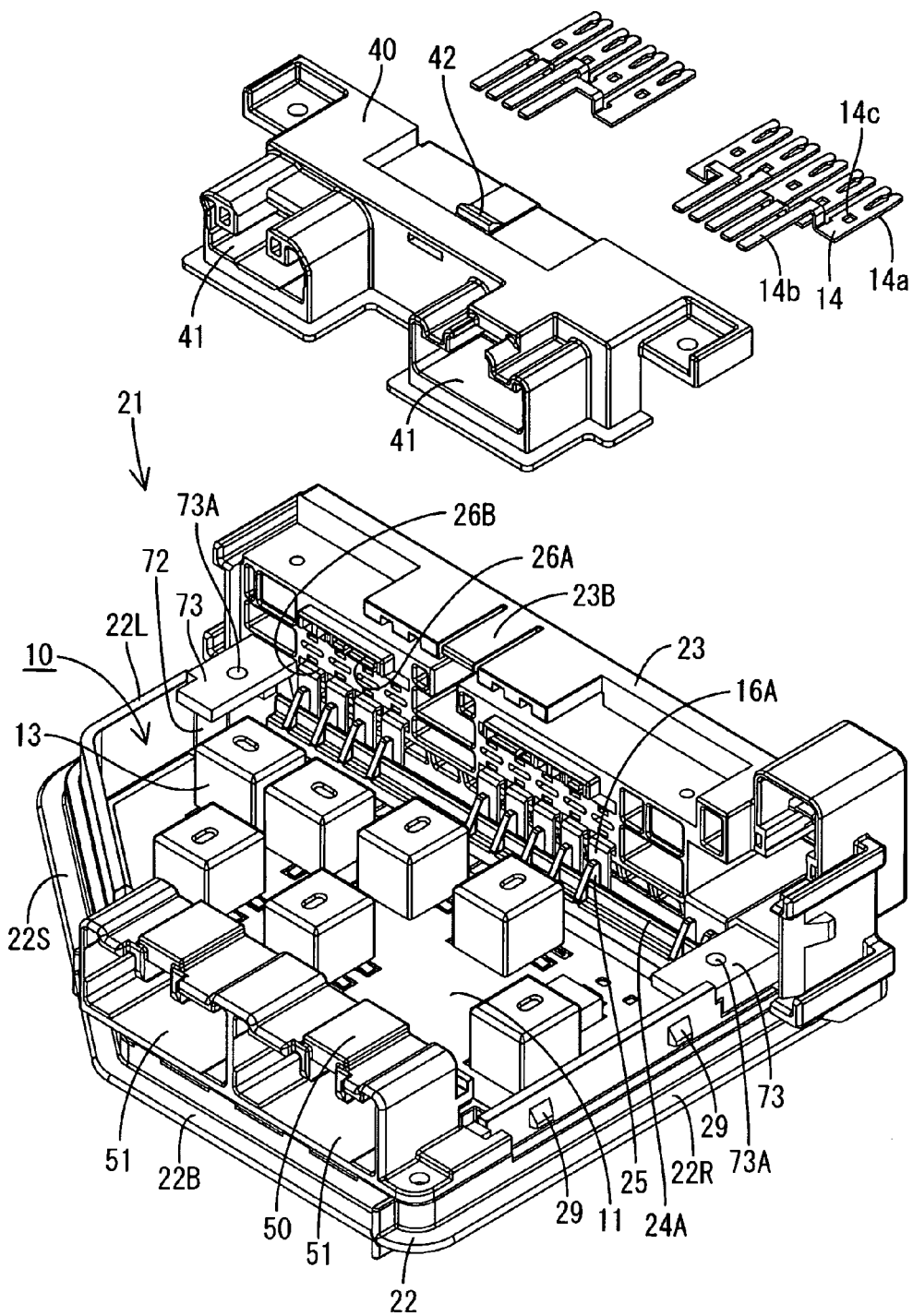
FIG. 5 is a perspective view depicting a state prior to incorporating a first connector housing onto the second frame member.

The circuit structure 10, as shown in FIG. 2, comprises a printed circuit board 11, a plurality of bus bars 12 disposed along the rear side of the printed circuit board 11 (i.e., underneath the circuit board 11), switching elements 13, which are circuit elements such as relays mounted onto the front side of the printed circuit board 11 (i.e., on the surface of the circuit board 11), and terminal metals 14 (shown in FIG. 5). The printed circuit board 11 is in a generally rectangular shape. However, a region in the lower end edge of the circuit board 11 (i.e., the bottom edge) contains an inclined edge part angled toward the left edge.

The bus bars 12 are bonded onto the rear side of the printed circuit board 11. A plurality of first terminal parts 15A (FIG. 2) is formed on end portions of the bus bars 12 and extends from the top edge of the printed circuit board 11. A plurality of second terminal parts 15B, which is also formed on end portions of the bus bars 12, extends from the bottom edge of the printed circuit board 11.

A first terminal part 15A is configured by a rising edge portion 16A, rising to the front side (i.e., upward) substantially perpendicular to the printed circuit board 11, and a terminal part 17A extending substantially perpendicular to the rising portion 16A (i.e., approximately parallel to the printed circuit board 11) and top ward from the rising end of the rising portion 16A (to the side opposite of the printed circuit board 11). Each of the first terminal parts 15A substantially form a capital letter L when viewed from a side direction. The plurality of first terminal parts 15A is arranged in parallel along the top edge of the printed circuit board 11. Contrarily, a second terminal part 15B is configured by a rising edge portion 16B, rising to the front side (i.e., upward), substantially perpendicular to the printed circuit board 11, and a tab part 17B extending substantially perpendicular to the rising edge portion 16B (i.e., approximately in parallel to the printed circuit board 11) and bottom ward from the rising end of this rising portion 16B (i.e., to the side opposite of the printed circuit board 11). Each of the second terminal parts 15B also substantially form a capital letter L when viewed from a side direction. This plurality of second terminal parts 15B is arranged in parallel along the bottom rightward region (i.e., the region parallel to the top edge) and apart from the inclined edge portion of the left bottom edge of the printed circuit board 11. These second terminal parts 15B are to be connected to an external harness (not shown in the drawing), thereby becoming a power feeding route for electric components.

As shown in FIG. 5, a terminal metal 14 is a metal plate member having undergone a bending process and holistically forms a slender shape in the vertical direction. Substantially, an upper half region of a terminal metal 14 is a fuse contact portion 14a, approximately shaped the same as the terminal part 17A of the first terminal part 15A. While substantially a lower half region of a terminal metal 14 is an output contact part 14b, approximately shaped the same as the tab part 17B of the second terminal part 15B. This terminal metal 14 is attached to a second frame member 23 and a first connector housing 40 to be described later. Like the second terminal parts 15B, the terminal metals 14 are also connected to an external harness (not shown in the drawing), thereby becoming a power feeding route for electric components.

Figure 3:
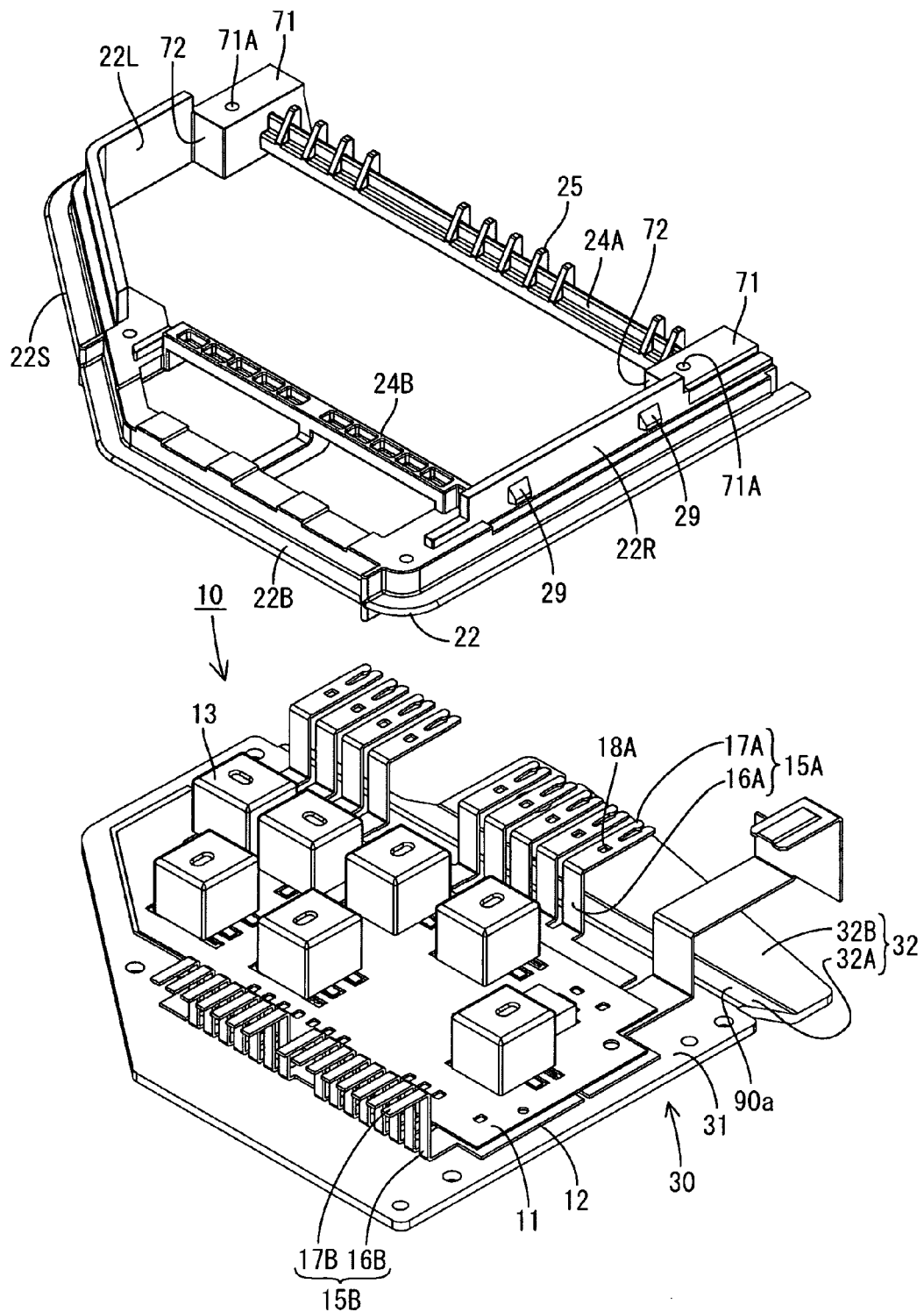
FIG. 3 is a perspective view depicting a state prior to incorporating a first frame member with the circuit structure.

As shown in FIGS. 1 and 3, the casing 20 comprises a frame 21, made of insulating material selected from a group comprising synthetic resins, etc., a heat sink 30 made of metal and fixed to the frame 21 so as to close the rear side opening of the frame 21, a cover 60 made of synthetic resin incorporated with the frame 21 so as to close the opening of the front side of the frame 21 (i.e., the side opposite of the heat sink 30), a first connector housing 40 made of synthetic resin and incorporated with the frame 21, and a second connector housing 50 made of synthetic resin and incorporated with the frame 21.

Figure 4:
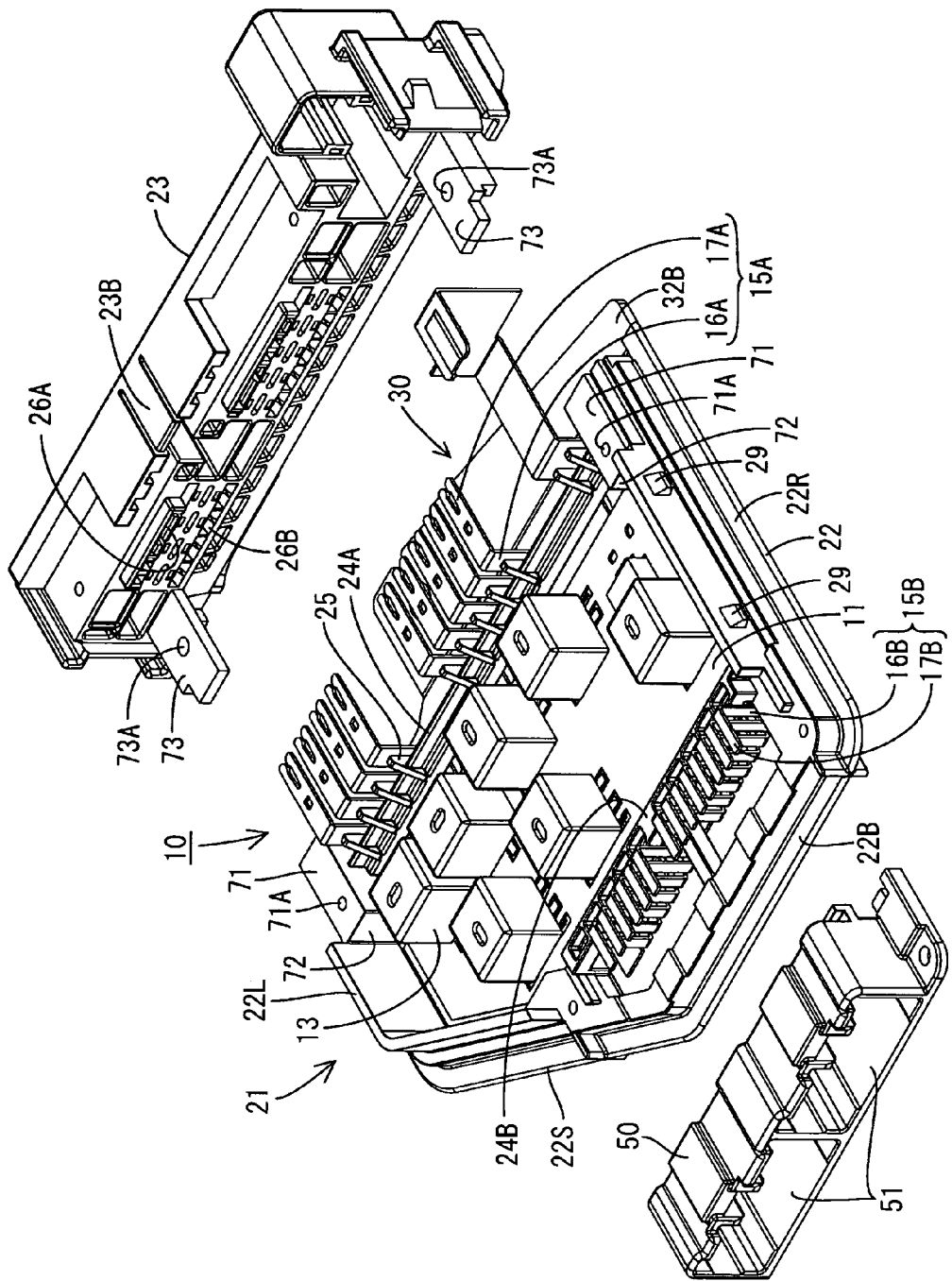
FIG. 4 is a perspective view depicting a state prior to incorporating a second frame member and a second connector housing into the first frame member.

As shown in FIG. 4, a frame 21 is configured by incorporating two parts, that is, a first frame member 22 and a second frame member 23 functioning as a fuse box. The frame 21 is disposed so as to enclose the whole circumference of the circuit structure 10 in a continuous fashion along the periphery of the printed circuit board 11. The frame 21 is fixed onto the surface of the heat sink 30 with an adhesive sealing agent 91 (see FIGS. 13, 15-17). The first frame member 22 consists of a bottom frame part 22B, along the bottom edge of the periphery of the printed circuit board 11, a left frame part 22L extending in the shape of a straight line along the left edge portion of the printed circuit board 11, and a right frame part 22R extending in the shape of a straight line along the right edge portion of the printed circuit board 11 from the right end portion of the bottom frame part 22B. The first frame member 22 is approximately shaped as an angular capital letter C. More specifically, substantially half of the bottom frame part 22B of the first frame member 22 is an inclined frame part 22S disposed in a direction diagonal to both of the left and right frame parts 22L and 22R of the first frame member 22. The inclined frame part 22S extends along the inclined edge portion of the left bottom edge of the printed circuit board 11. The rightward regions apart from the inclined frame part 22S in the bottom frame part 22B are located beneath the second terminal parts 15B.

As shown in FIG. 4, in the first frame member 22 a bridge part 24A is formed so as to connect the portions slightly lower than the upper end portions of both of the left and right frame parts 22L and 22R. This bridge part 24A is located lower than the rising portion 16A of the first terminal parts 15A (i.e., on the side of the printed circuit board 11, which is the side opposite to the terminal parts 17A). With regard to the bridge part 24A, plate-shaped terminal supporting parts 25, perpendicular to the longitudinal direction of the bridge part 24A and corresponding to the rising parts 16A of the respective bus bars 12, are formed to contact the rising parts 16A from the side of the printed circuit board 11.

Also for the first frame member 22, a complementary bridge part 24B is formed so as to bring a location close to the lower end of the right frame part 22R into connection with an approximately central location of the inclined frame part 22S. The complementary bridge part 24 is disposed substantially parallel to the bottom frame part 22B. In addition, the complementary bridge part 24B contacts the rising parts 16B of the second terminal parts 15B from an upper direction (i.e., from the side of the printed circuit board 11, which is the side opposite to the tab parts 17B).

Figure 7:
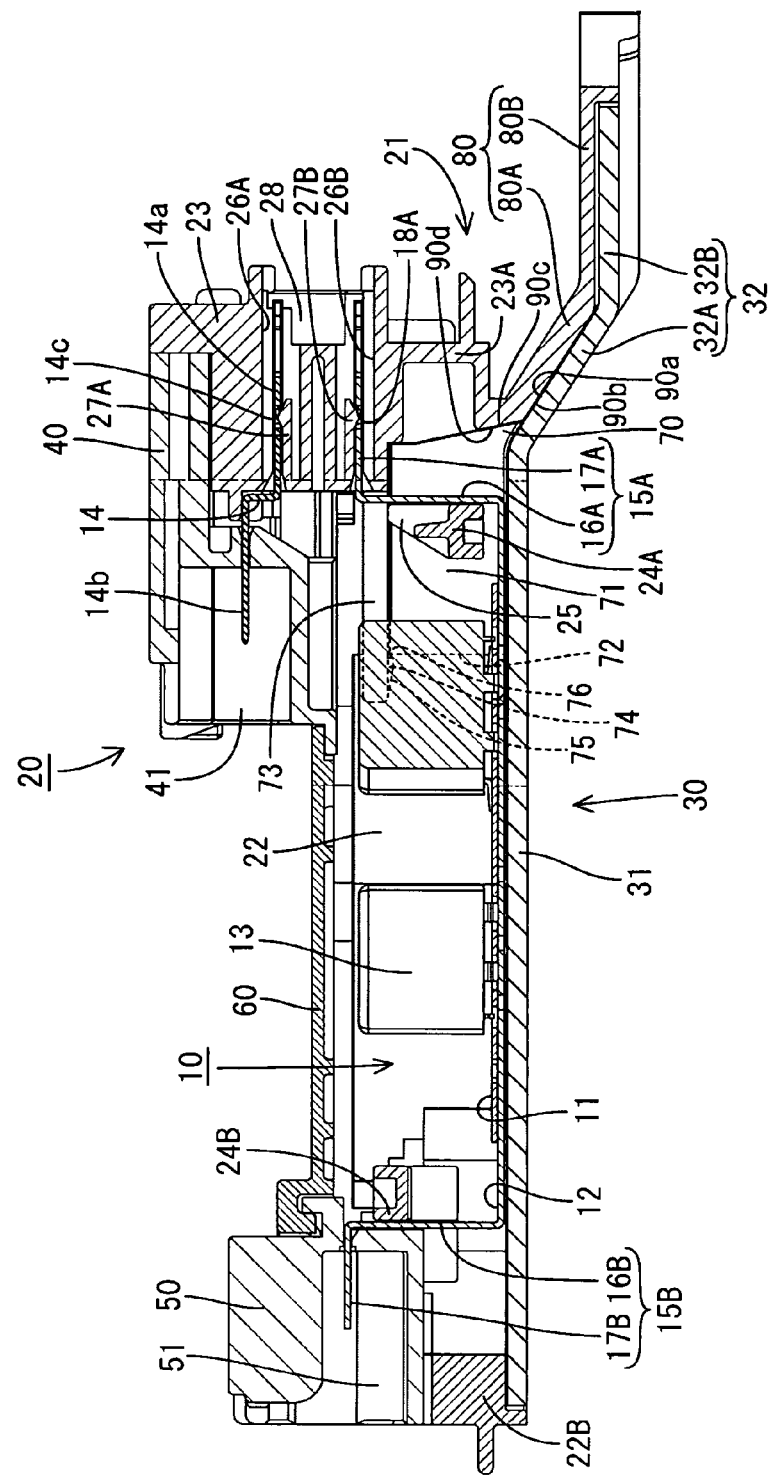
FIG. 7 is a sectional view of an electronic junction box.
Figure 9:
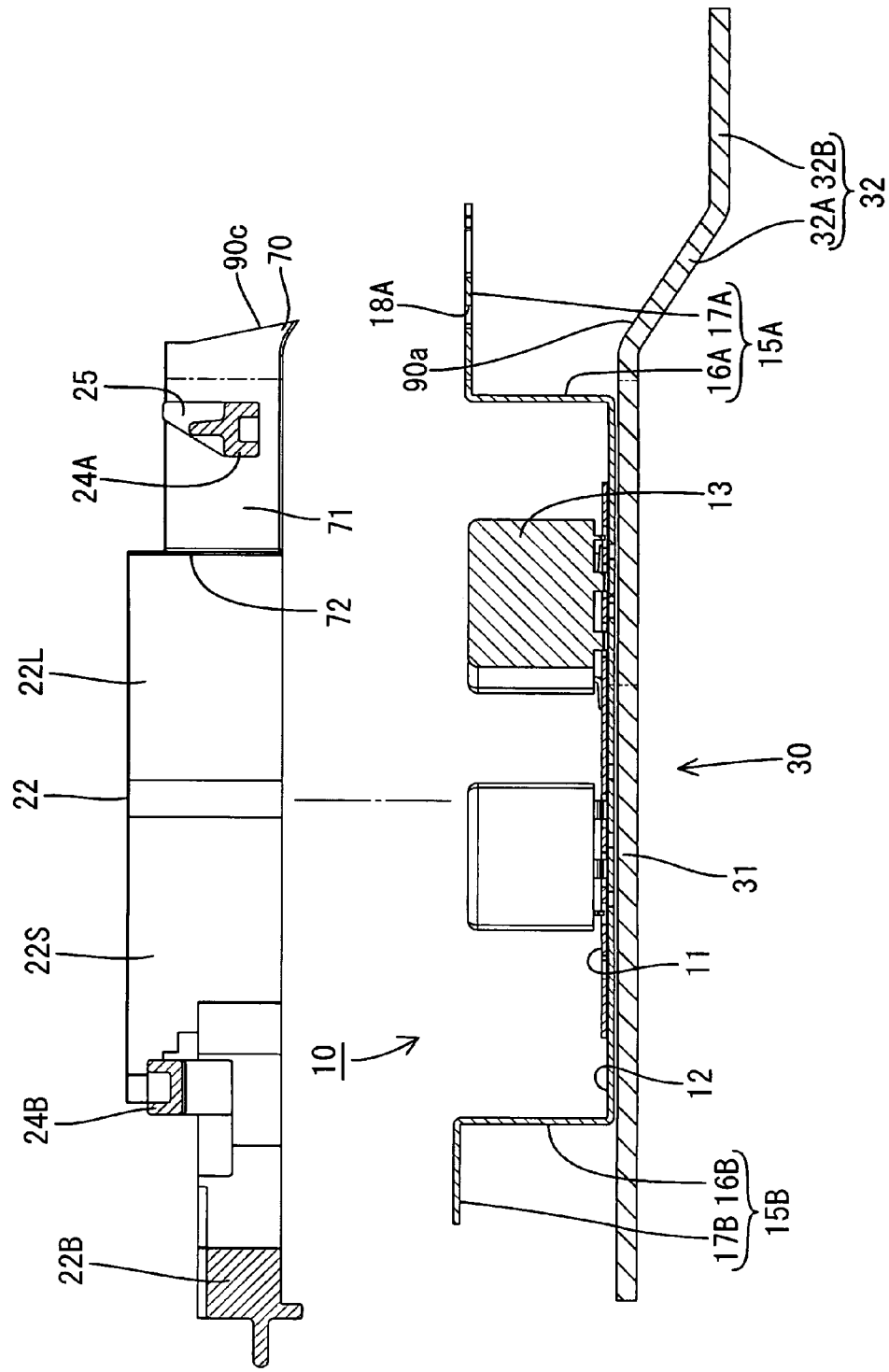
FIG. 9 is a sectional view depicting a state prior to incorporating a first frame member onto a circuit structure.

In the upper end parts of both of the left and right frame parts 22L and 22R of the first frame member 22, as shown in FIGS. 7 and 9, a cuneiform (in sectional view) overhanging part 70 is formed in order to bring the rear side of the upper end edge part onto the protrusion in the diagonally upper rear direction. The rear side of this overhanging part 70 is given the same gradient as that of the first sealing surface 90a formed on the inclined portion 32A of the heat sink 30, to be described later. In addition, the region including at least the top edge part in the upper end surface of this overhanging part 70 (i.e., the right most end as viewed in FIGS. 7 and 9) is a flat second sealing surface 90c, inclined at an angle close to perpendicular to the horizontal direction (i.e., the horizontal direction is the direction parallel to the direction of incorporating the second frame member 23 to the heat sink 30, and the direction parallel to the main plate body 31 of the heat sink 30).

The second frame member 23 is disposed along the top edge of the printed circuit board 11. The second frame member 23 is fixed onto the front surface of the heat sink 30 with sealing agent 91, and fixed to the first frame member 22 with sealing agent 91. Inside of the second frame member 23, a plurality of cavities 26A and 26B in a vertical direction are formed so as to penetrate through the frame member 23, and are arranged in parallel along the left and right directions. The plurality of cavities 26A and 26B are separated into two front and rear alignments (see FIG. 4). The terminal parts 17A of the first terminal parts 15A are inserted into the cavities 26B of the rear side alignment from a bottom direction. The inserted first terminal parts 15A are held in a removal-preventing state by engaging the engagement holes 18A of the terminal parts 17A with the lances 27B of the cavities 26B (see FIG. 7). And, in the second frame member 23, the portions 23A, more rear than the cavities 26B of the rear side alignment, will be disposed more to the rear side than the terminal parts 17A of the first terminal parts 15A (i.e., between the terminal parts 17A and the heat sink 30, see FIG. 7).

Figure 10:
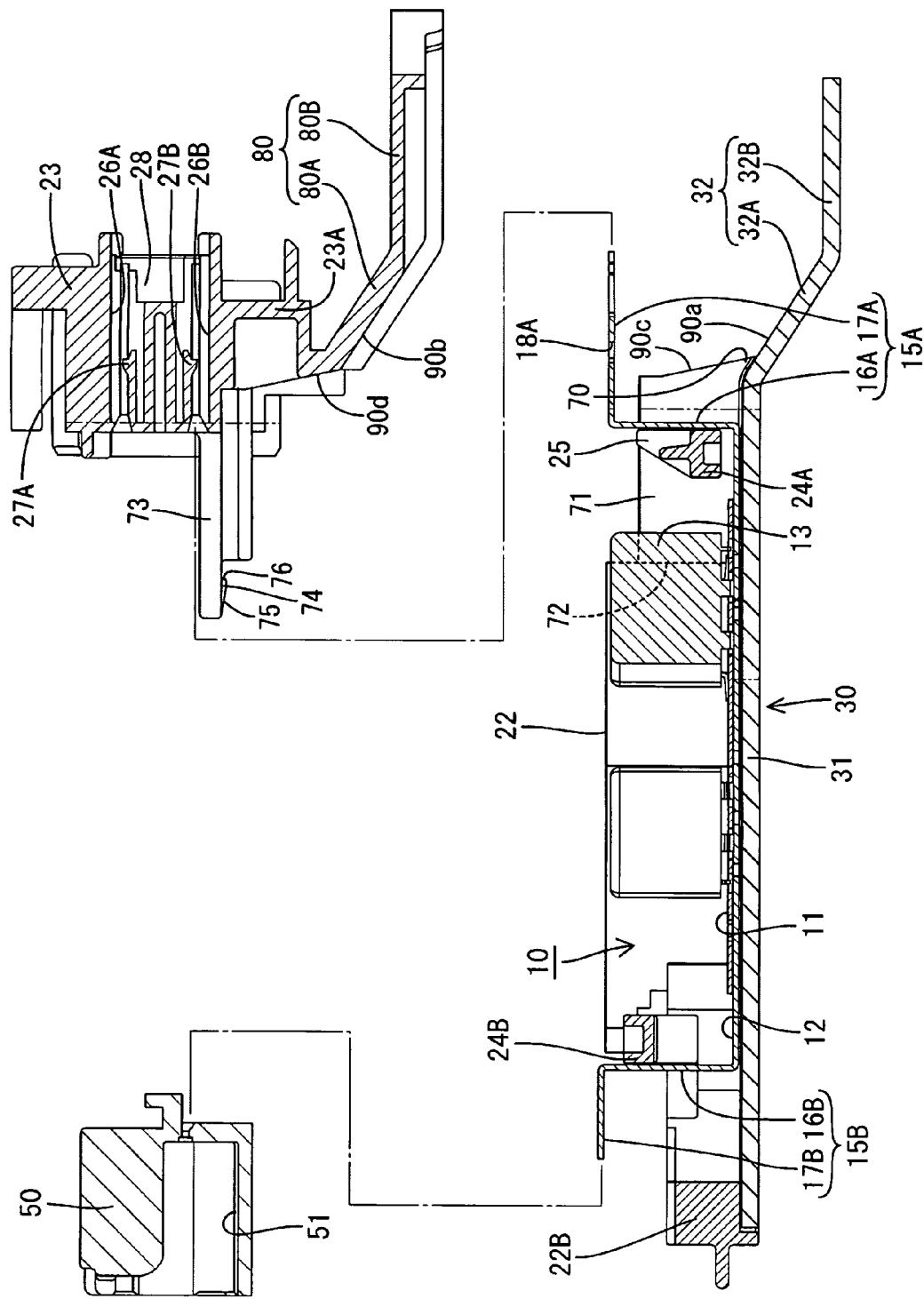
FIG. 10 is a sectional view depicting a state prior to incorporating a second frame member and a second connector housing onto the first frame member.
Figure 15:
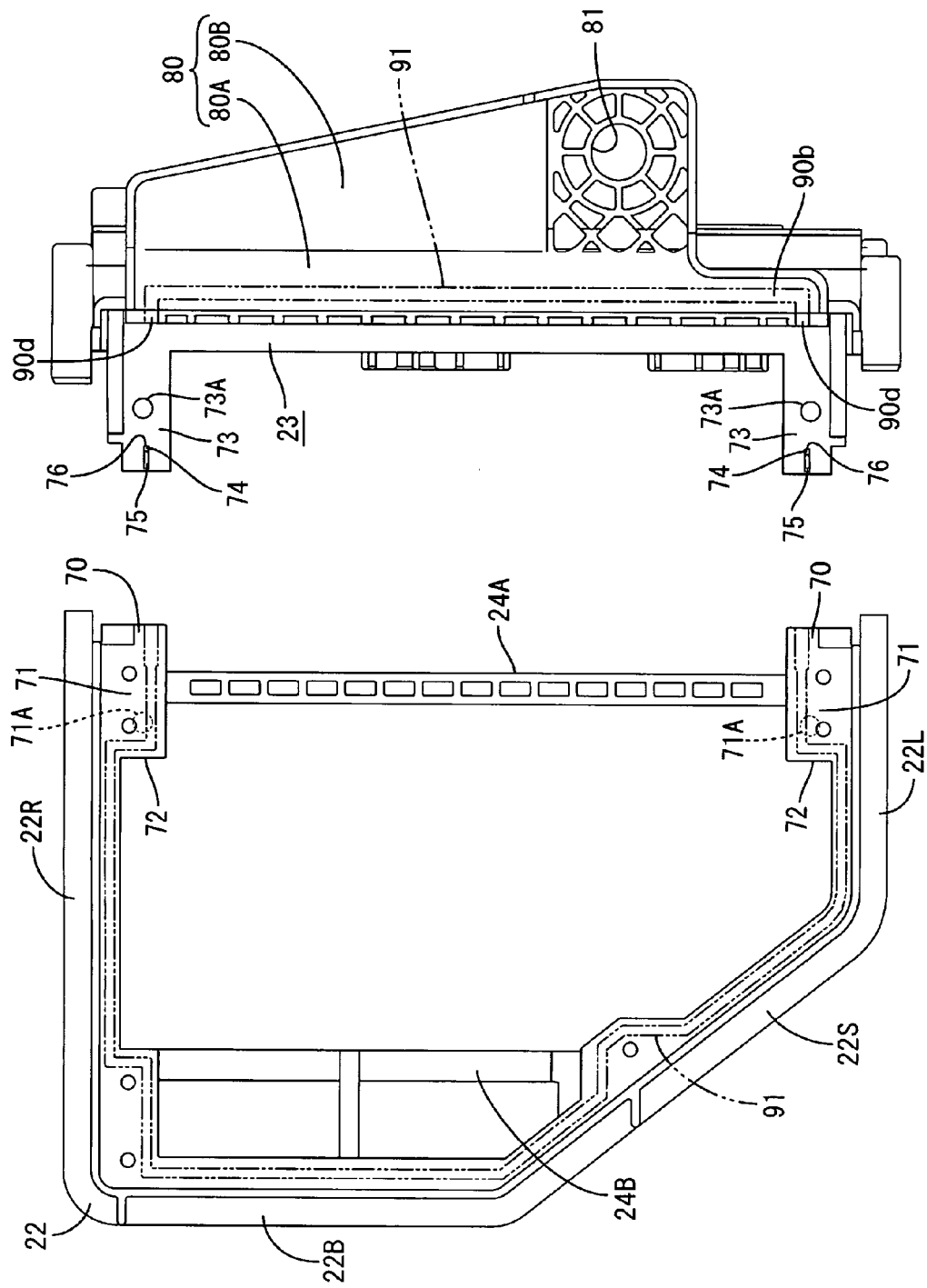
FIG. 15 is a bottom view depicting a state with the first frame member and the second frame member having been separated.
Figure 16:
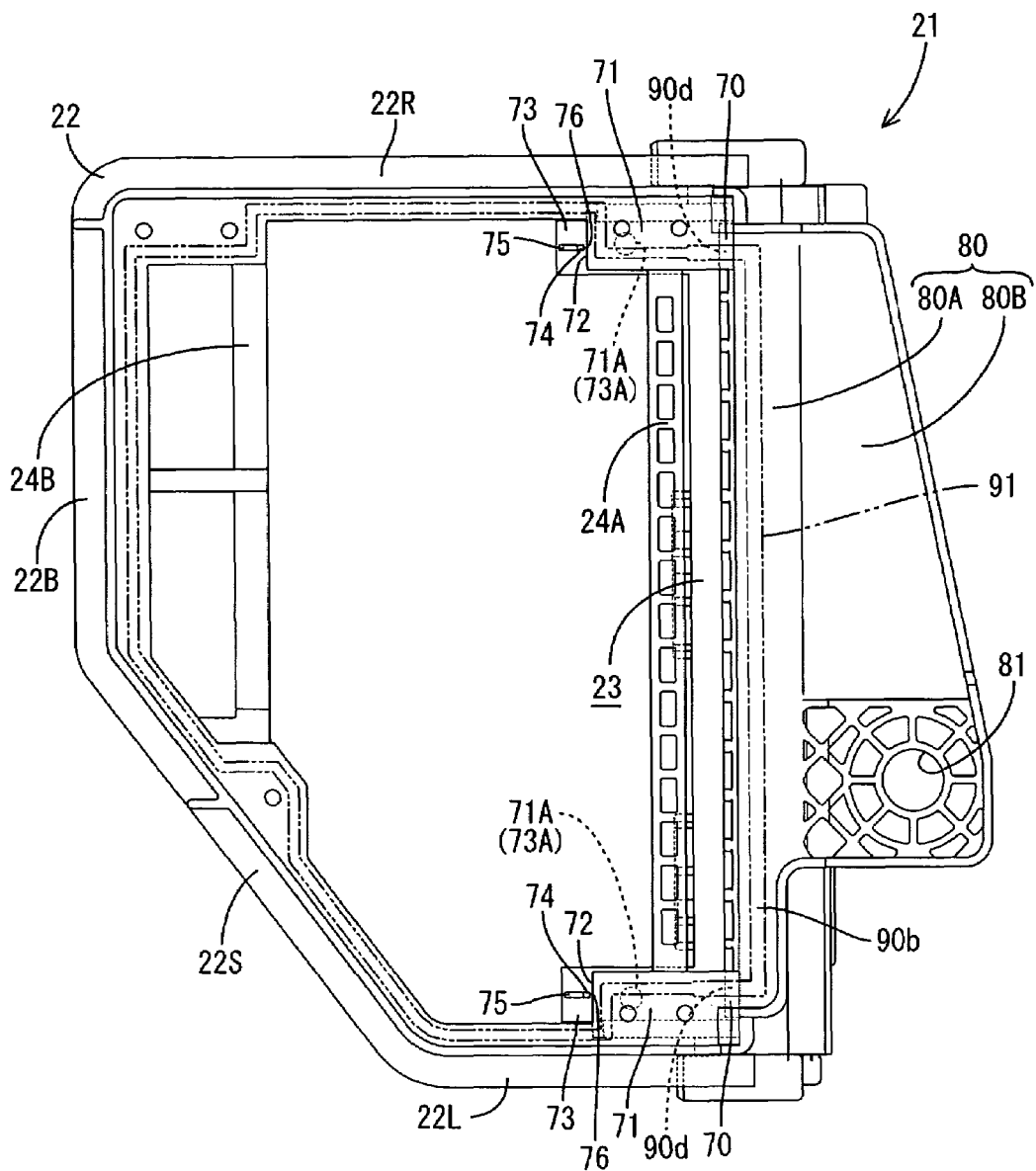
FIG. 16 is a bottom view of the frame configured by incorporating the first frame member together with the second frame member.

In the second frame member 23, a covering lid part 80 is formed along the top edge thereof (see FIGS. 7, 10, and 15). The covering lid part 80 comprises a plate-shaped inclined covering part 80A, extending out diagonally in the rear upward direction (i.e., to the rear side) from the top edge of the second frame member 23, and a plate-shaped horizontal covering part 80B extending out horizontally (i.e., in parallel to the main plate body 31 of the heat sink 30) from the top edge of the inclined covering part 80A.

The width size of the inclined covering part 80A is set approximately the same as that of the second frame member 23, and generally forms a slender shape in the direction of width (i.e., a left-right direction). The rear side of this inclined covering part 80A is a flat complementary sealing surface 90b configured with the same gradient as that of the rear side of the overhanging part 70 of the first frame member 22. In addition, a lower end surface of inclined covering part 80A becomes a flat third sealing surface 90d configured with the same gradient as that of the second sealing surface 90c of the second frame member 21.

On the other hand, the horizontal covering part 80B is holistically slender in the direction of width and is formed over a range extending from the right end of the inclined covering part 80A to a location slightly closer to the center from the left end of the inclined covering part 80A. The top edge of the horizontal covering part 80B is at an angle relative to the top edge of the inclined covering part 80A (i.e., a boundary line between the inclined covering part 80A and the horizontal covering part 80B). As a result, the top dimension of the horizontal covering part 80B gradually increases from the right end side to the left end side. In addition, in the horizontal covering part 80B, a circular through hole 81 is formed (see FIG. 14).

The heat sink 30 is approximately symmetrical with the printed circuit board 11, and comprises an integral main plate body 31, shaped slightly larger than the printed circuit board 11, and a plate-shaped bracket 32 extending out step-wise below the rear side surface from the top edge of the main plate body 31 (see FIG. 3). The rear surfaces of the bus bars 12 are fixed (also see FIG. 13) in an insulated state with an adhesive agent (not shown in the drawing) on the front surface of the main plate body 31. In the fixed state, the printed circuit board 11 and the bus bars 12 (inclusive of the terminal parts 15A and 15B) do not protrude outward beyond the periphery of the heat sink 30, but are disposed inside of a plane projected in the front-to-rear direction (i.e., vertical direction) around the heat sink.

The bracket 32 links to the top edge of the main plate body 31 and includes a plate-shaped inclined part 32A extending out to the top in a diagonally rearward direction (i.e., to the rear side) from the top edge of this main plate body 31, and a plate-shaped attachment part 32B extending out to the top substantially in parallel to the main plate body 31 from the top edge of the inclined part 32A. The width size of the inclined part 32A is set to be approximately the same as that of the main plate body 31 or a slightly smaller size than the width of the main plate body 31. The inclined part 32A holistically forms a slender shape in the direction of width (i.e., a left-right direction). On the other hand, the attachment part 32B is holistically slender in the direction of width but is formed over a range extending from the right end of the inclined part 32A to a location a slightly closer to the center than the left end of the inclined part 32A. The top edge of the attachment part 32B is at an angle relative to the inclined part 32A and the top edge of the main plate body 31. As a result, the top dimension of the attachment part 32B in a top-bottom direction gradually increases from the right end side to the left end side (see FIG. 13). In addition, a protruding part 32D is essentially hammered out rearward to form a substantially rectangular shape at the left end of the attachment part 32B. In this protruding part 32D, a substantially circular bolt hole 32H is formed by piercing, and a cut 32C is formed that reaches the bolt hole 32H from the top edge of the attachment part 32B.

The front surface of the inclined part 32A is set to the same gradient (i.e., inclined angle) as that of the rear surface of the overhanging part 70 of the first frame member 22, as well as the same gradient as the complementary sealing surface 90b of the inclined covering part 80A of the second frame member 23. And, the lower end part region of the front surface of this inclined part 32A becomes the first sealing surface 90a. In a state of incorporating the second frame member 23 to the heat sink 30, the front surface of the inclined part 32A and the attachment part 32B are respectively covered and hidden by the inclined covering part 80A and the horizontal covering part 80B of the second frame member 23.

As shown in FIGS. 1 and 5, the first connector housing 40 has left and right circumferentially continuous fitting parts 41 opening downward, and a locking protrusion 42. A plurality of terminal metals 14 is incorporated with the first connector housing 40 by pressure-inserting the output contact parts 14b from above. In an incorporated state, the output contact parts 14b are accommodated inside of the circumferentially continuous fitting parts 41 and the fuse contact parts 14a protrude toward the top from the first connector housing 40. To these circumferentially continuous fitting parts 41, connectors (not shown in the drawing) of an external harness (not shown in the drawing) are fitted and the connecting terminals (not shown in the drawing) attached to the connectors are connected to the output contact parts 14b.

The first connector housing 40 is incorporated with the second frame member 23 from the bottom. In the process of incorporation, the fuse contact parts 14a are inserted into the cavities 26A of the front side of the second frame member 23 from the bottom and are held in a removal-preventing state by engaging the lances 27A of the cavities 26A with the engagement holes 14c thereof (see FIG. 7). The first connector housing 40 is locked with the second frame member 23 in an incorporated state by engaging the locking protrusion 42 of the first connector housing 40 with the locking arm 23B of the second frame member 23. The incorporated first connector housing 40 is located further to the front side (i.e., the side opposite to the printed circuit board 11) as compared to the first terminal parts 15A.

As shown in FIG. 7, a fuse accommodating space 28 in communication with the cavities 26A on the front side and the cavities 26B on the rear side is formed in the second frame member 23. In this fuse accommodating space 28 the terminal parts 17A of the first terminal parts 15A (located in the rear side) and the fuse contacting parts 14a of the terminal metals 14 (located in the front side) are brought into connection with fuses (not shown in the drawing).

As shown in FIG. 4, a second connector housing 50 is open to the bottom and has partitioned left and right circumferentially continuous fitting parts 51. The second connector housing 50 is incorporated onto the front surface of the rightward region (i.e., the region substantially parallel to the complementary bridging part 24B), apart from the inclined part 22S in the bottom frame part 22B of the first frame member 22. The second connector housing 50 is fixed in both the left and right end parts of the second connector housing 50 with screws (not shown in the drawing). In the process of incorporation, the tab parts 17B of the second terminal parts 15B pierce the top of the second connector housing 50 from a topward direction relative to the second connector housing 50. In an incorporated state, the tab parts 17B are accommodated inside of the circumferentially continuous fitting parts 51 (see FIG. 7). In addition, the second connector housing 50 is located further toward the bottom away from the complementary bridge part 24B. Likewise in an incorporated state, the tab parts 17B of the second terminal parts 15B are accommodated inside of the circumferentially continuous fitting parts 51. And to these circumferentially continuous fitting parts 51, connectors (not shown in the drawing) of an external harness (not shown in the drawing) are fitted, and the connecting terminals (not shown in the drawing) attached to the connectors are connected to the tab parts 17B.

Figure 6:
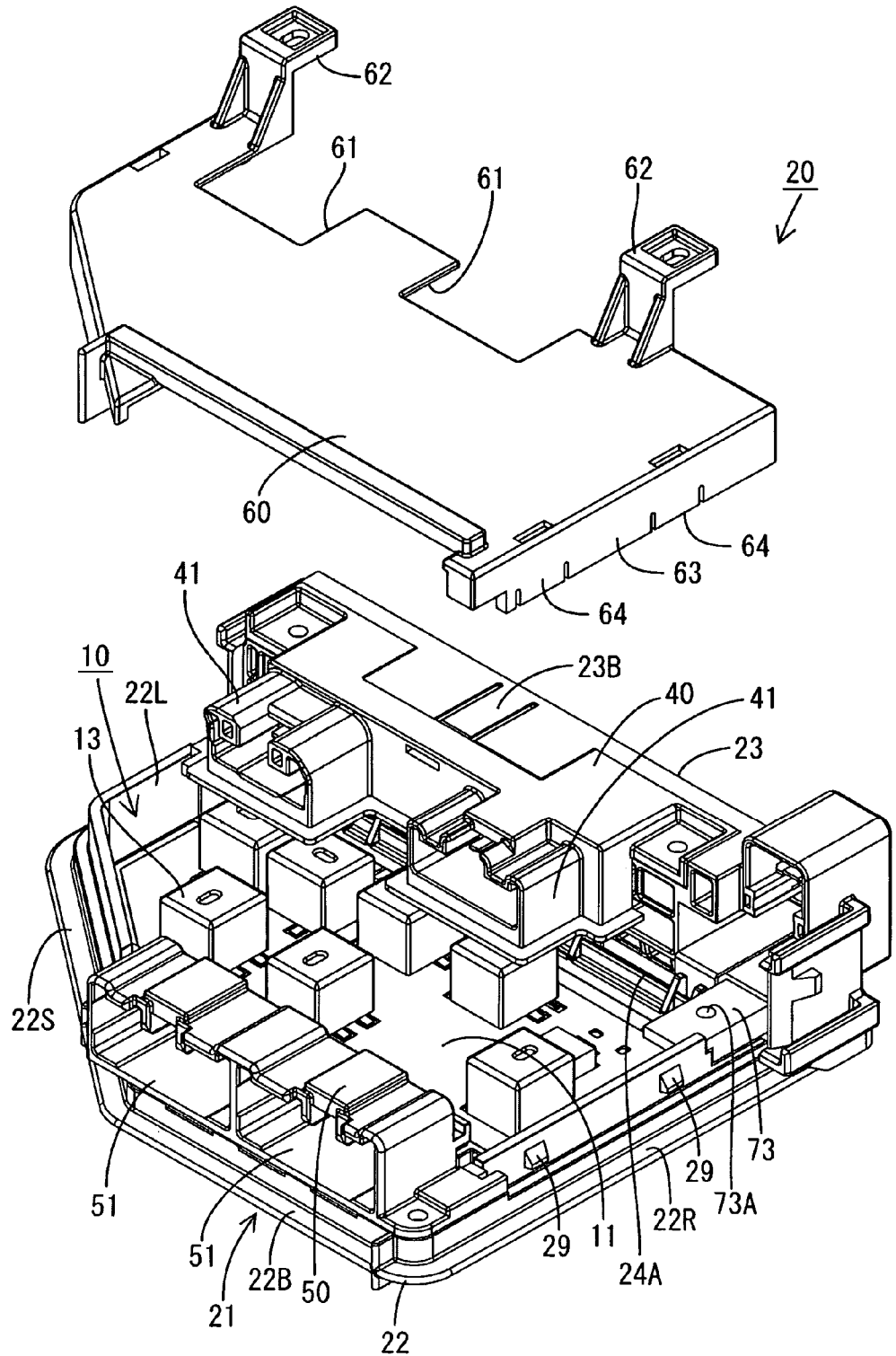
FIG. 6 is a perspective view depicting a state prior to incorporating a cover onto the frame.

As shown in FIG. 6, the cover 60 is holistically approximately symmetrical to the printed circuit board 11 and is shaped slightly larger than the printed circuit board 11. Cut-away parts 61 are formed with rectangular shapes in the top edge of the cover 60 in order to avoid interfering with the two circumferentially continuous fitting parts 41 of the first connector housing 40 (also see FIG. 5). In addition, in the top edge of the cover 60 are formed a left-right pair of attachment parts 62, rising uptoward the front side. Moreover, in both of the left-right side edges of the cover 60, an engaging rib 63 is formed extending slenderly in the top-bottom direction. Elastomeric engaging pieces 64 are formed in the engaging rib 63. Such a cover 60 is incorporated with the frame 21 from the front. The cover 60 is locked to the first frame member 22 in an incorporated state by bringing the elastomeric engaging pieces 64 of the engaging rib 63 into engagement with engaging protrusions 29 on both of the left and right outside surfaces of the first frame member 22. In addition, the attachment part 62 is brought into contact with the front side of the first connector housing 40. The cover 60, the first connector housing 40, and the second frame member 23, are fixed together by screws (not shown in the drawing) threaded from the front side through both of the left and right end portions of the attachment parts 62 and the first connector housing 40 and into the second frame member 23.

Here, attachment stands 71 are respectively provided in the upper end parts in both of the left and right frame parts 22L and 22R of the first frame member 22 (see FIG. 15). Each attachment stand 71 is shaped as a rectangular parallelepiped that is slightly longer in the vertical direction. In the upper end part of each attachment stand 71 is formed an overhanging part 70. The lower surface of each attachment stand 71 is configured as a flat surface and is employed as an engaging surface 72, substantially perpendicular to the direction of incorporating the second frame member 23 to the heat sink 30. Screw holes 71A are formed approximately in the central position of each attachment stand 71. In addition, the bridge part 24A functions to bring these attachment stands 71 into communication with each other.

Attachment pieces 73 are respectively formed in locations in the second frame member 23 corresponding to the respective attachment stands 71. In other words, the attachment pieces 73 are located approximately in the center of both of the left-right end parts of the second frame member 23 in the front-rear direction. Each attachment piece 73 is shaped substantially as a rectangular plate that extends toward the bottom from the lower surface of the second frame member 23, and is longer in the vertical direction. Each attachment piece 73 is configured to be attachable to the front surface of the attachment stand 71 of the first frame member 22 from the front side. A screw hole 73A is formed approximately in the central location of each attachment piece 73, in other words, in the location corresponding with the screw hole 71A of the attachment stand 71. The second frame member 23 is fixed with the first frame member 22 by threading in a screw (not shown in the drawing) in each location, with both screw holes 71A and 73A being mutually co-aligned.

Figure 14:
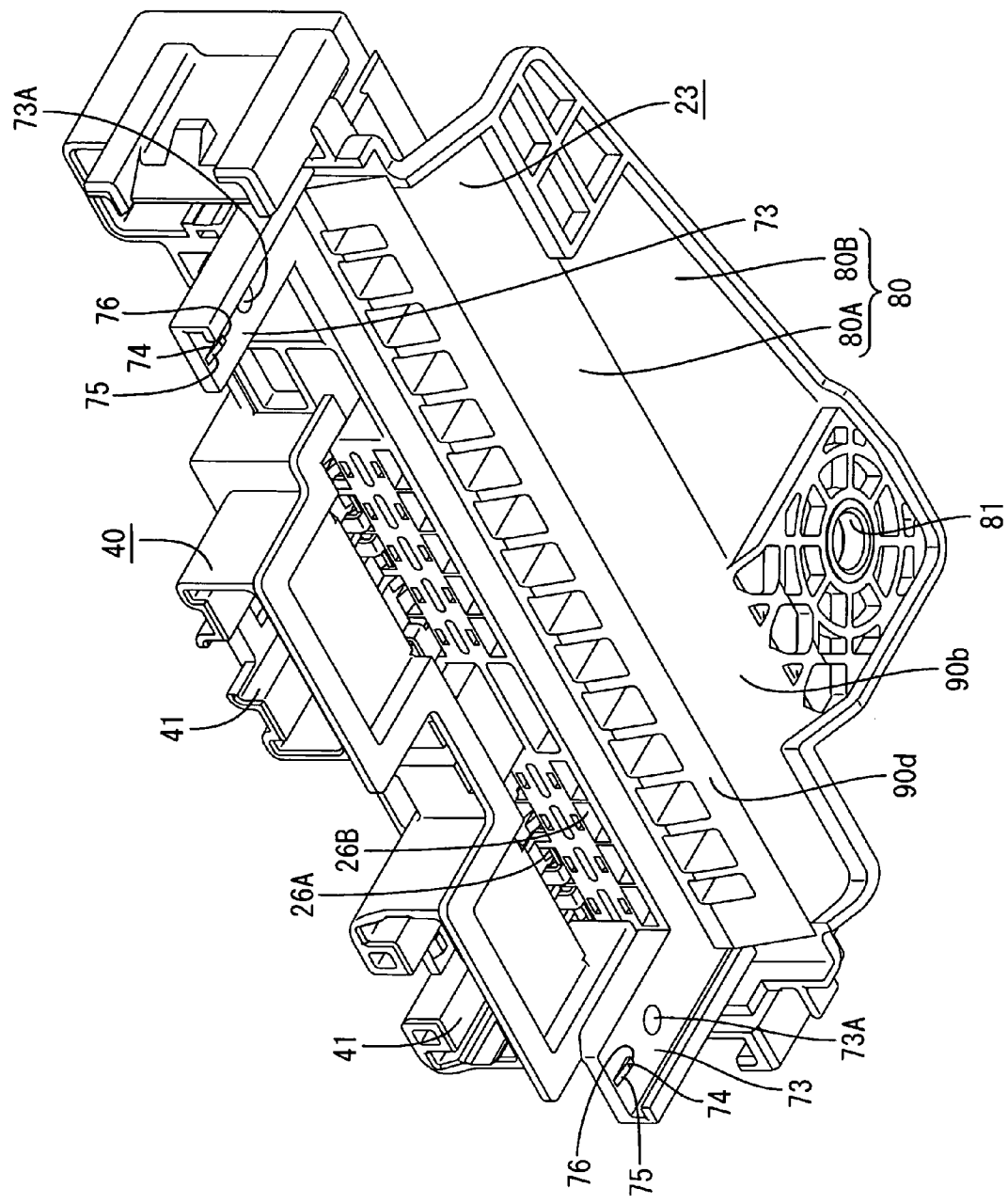
FIG. 14 is a perspective view of the second frame member, viewed from the backside, in a state with the first connector housing having been incorporated.

In addition, on the rear side of both of the left and right attachment pieces 73, as shown in FIG. 14, an engaging protrusion 74 (corresponding to an engagement part of the present invention) is respectively formed at one site, that is, at two sites in total for the second frame member 23. The engaging protrusion 74 is provided approximately in the central location in the left-right direction in the bottom part of each attachment piece 73. Each engaging protrusion 74 is formed to protrude in the rearward direction from the rear side of the attachment piece 73 and is slenderly shaped in the vertical direction. The lower surfaces of these engaging protrusions 74 are made to be guiding inclined surfaces 75 that descend toward the bottom. On the other hand, the upper surfaces of the engaging protrusions 74 are substantially perpendicular to the rear sides of the attachment pieces 73. The upper surfaces of the engaging protrusions 74 are made to be displacement-restraining surfaces 76 for facing engaging surfaces 72 of the attachment stands 71. And, in the state in which the second frame member 23 is attached to the first frame member 22, that is, the attachment pieces 73 are attached to the front surfaces of the attachment stands 71, these displacement-restraining surfaces 76 are brought into attachment with the engaging surfaces 72 from a rearward direction.

Next, the procedure of incorporating the electric junction box will be described.

On the occasion of incorporation, firstly, bus bars 12 are fixed to a printed circuit board 11, onto which switching elements 13 have not yet been implemented, using an adhesive agent (not shown in the drawing). Subsequently, the bus bars 12 and the heat sink 30 are bonded together. At this time, since switching elements 13 have not yet been mounted onto the printed circuit board 11, the application of pressure over a wide range of the front surface of the printed circuit board 11 can bring the bus bars 12 and the heat sink 30 into a firm bonding condition.

Figure 8:
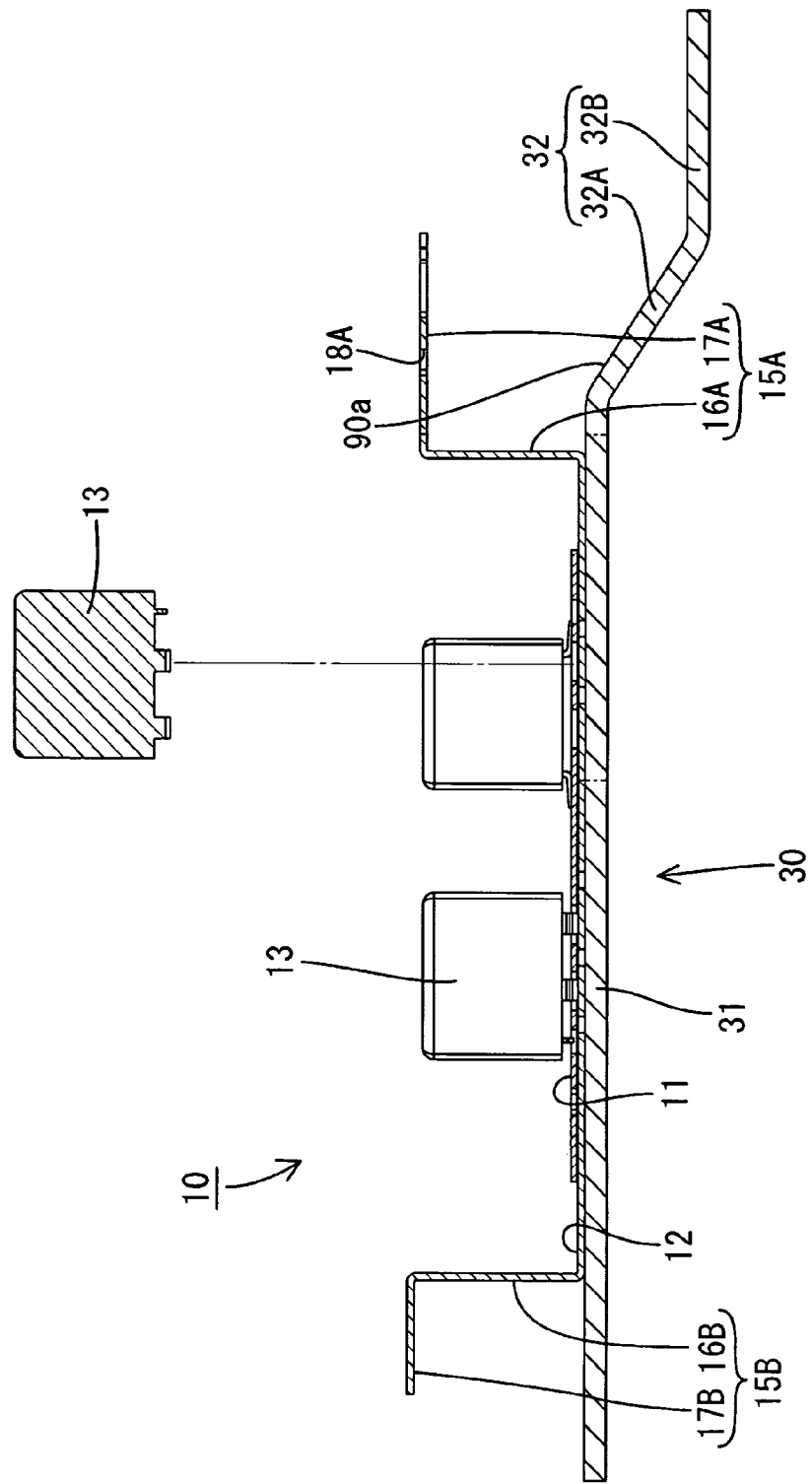
FIG. 8 is a sectional view of a circuit structure.

After which, the switching elements 13 are mounted onto the printed circuit board 11 (see FIGS. 2 and 8). Thereby, the circuit structure 10 is generally assembled (see FIGS. 3 and 9). An adhesive sealing agent 91 is then coated onto the front surface of the main plate body 31 of the heat sink 30 so as to substantially shape a capital letter "C" along the first frame member 22. The same sealing agent 91 is coated onto the first sealing surface 90a of the heat sink 30 and the rear side of the first frame member 22. When the first frame member 22 is manipulated so as to approach the heat sink 30 from the front side, substantially perpendicular to the main plate body 31, the sealing agent 91 bonds the first frame member 22 to the front surface of the main plate body 31 of the heat sink 30 in a liquid tight condition. At the same time, the rear side of the overhanging part 70 of the first frame member 22 is bonded with the bottom part of the first sealing surface 90a of the inclined part 32A of the heat sink 30 (see FIGS. 7 and 10). Thereby, the gap between the rear side of the first frame member 22 and the front surface of the heat sink 30 is sealed.

In this state, the second sealing surface 90c is inclined in the direction of incorporation of the second frame member 23 to the heat sink 30 (i.e., the direction of incorporation is parallel to the main plate body 31 of the heat sink 30) and is linked to the first sealing surface 90a so as to form an obtuse angle. In other words, the second sealing surface 90c is linked to the first sealing surface 90a so as to rise from the bottom part of the first sealing surface 90a in the front diagonal direction towards the bottom.

Figure 17:
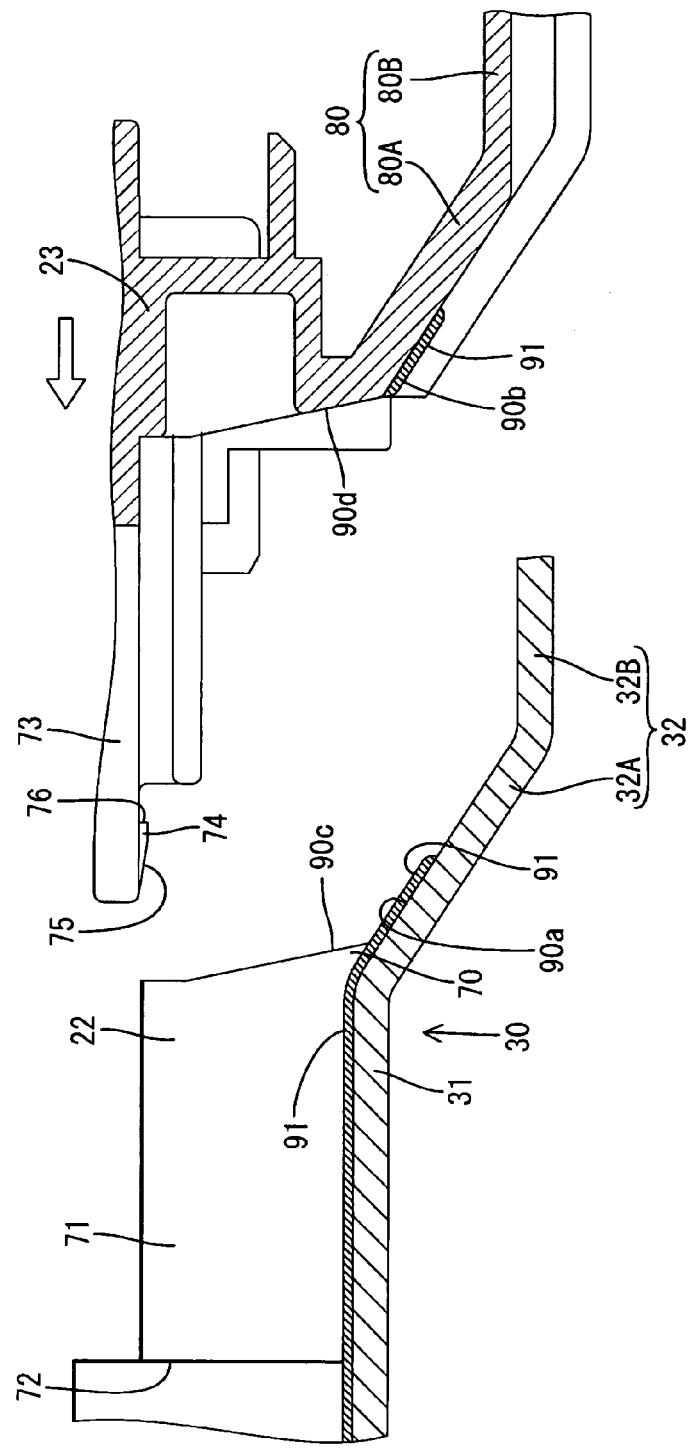
FIG. 17 is an enlarged sectional view depicting the process of incorporating the second frame member onto a heat sink.
Figure 18:
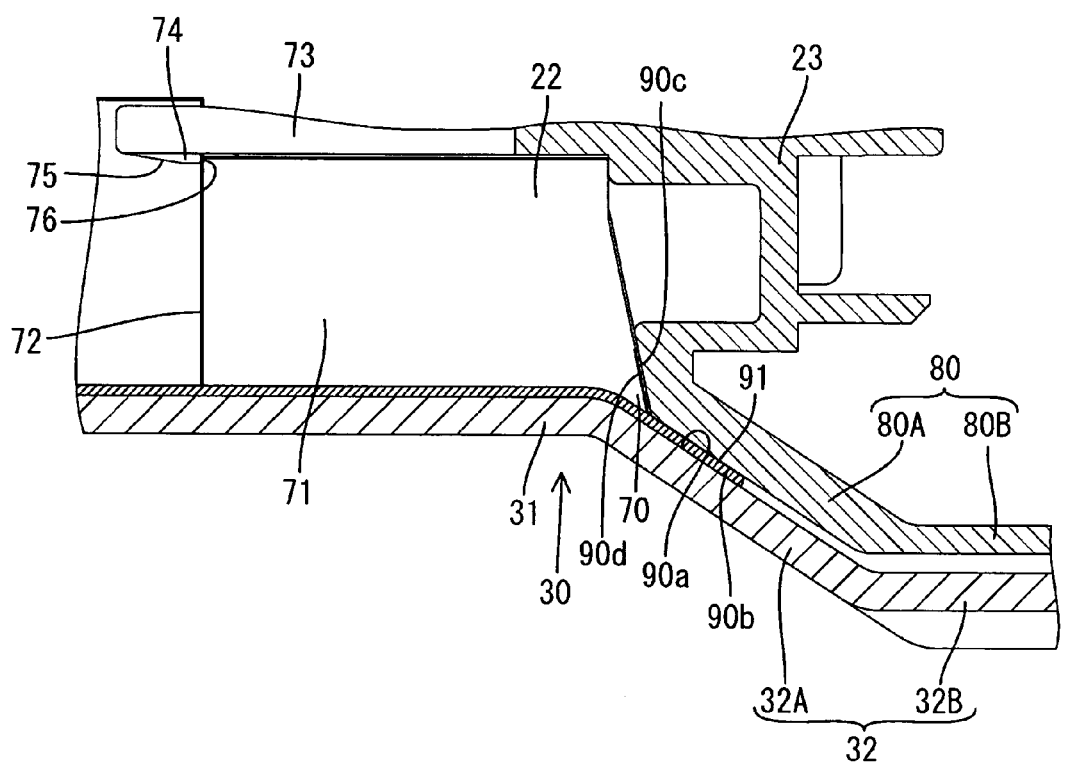
FIG. 18 is an enlarged sectional view depicting a state with a second frame member having been incorporated onto the heat sink.

Now, after the first frame member 22 is fixed, the adhesive sealing agent 91 is coated onto the complementary sealing surface 90b of the second frame member 23 (see FIG. 17). At this time, the sealing agent 91 does not have to be coated onto the second sealing surface 90c on the top end surface of the first frame member 22 and the third sealing surface 90d on the bottom end surface of the second frame member 23. The second frame member 23 is then manipulated so as to approach the first frame member 22 and the heat sink 30 substantially parallel to the main plate body 31 of the heat sink 30 from the upper direction, and incorporation goes on at this time. In the course of the process of incorporation, before the second frame member 23 reaches a normal incorporating position, the sealing agent 91 on the complementary sealing surface 90b and the sealing agent 91 on the first sealing surface 90a are brought into surface contact at approximately the same time and approximately over the entire coated regions. And just after the surface contact, the second frame member 23 reaches a normal incorporated state, bringing the first sealing surface 90a and the complementary sealing surface 90b into a liquid tight condition. Thereby the gap is sealed between the rear side of the second frame member 23 and the front surface of the heat sink 30.

During the period of time from the point of surface contact between the sealing agent 91 on the complementary sealing surface 90b and the sealing agent 91 on the first sealing surface 90a, until the second frame member 23 reaches a normal position of incorporation with the heat sink 30, the rear side of the inclined covering part 80A of the second frame member 23 pushes so as to apply pressure and slightly moves the sealing agent 91 on the first sealing surface 90a generally towards the bottom (i.e., forward in the direction of incorporating the second frame member 23, and leftward in FIG. 17). The bottom edge portion of the inclined covering part 80A pushes and moves a quantity of the sealing agent 91 on the first sealing surface 90a, so as to remove it due to friction. The sealing agent 91, pushed and moved toward the bottom by the second frame member 23, is pushed up along the second sealing surface 90c, consequently creating a state in which the sealing agent 91 is coated onto the second sealing surface 90c. Thereafter, the third sealing surface 90d of the second frame member 23 is brought into a state of surface contact with the second sealing surface 90c, at an angle as approximately as high as a right angle, so that the second sealing surface 90c and the third sealing surface 90d are brought into bonding in a liquid tight condition (see FIG. 18). As a result, the gap is also sealed between the top surface of the first frame member 22 and the bottom surface of the second frame member 23.

Figure 11:
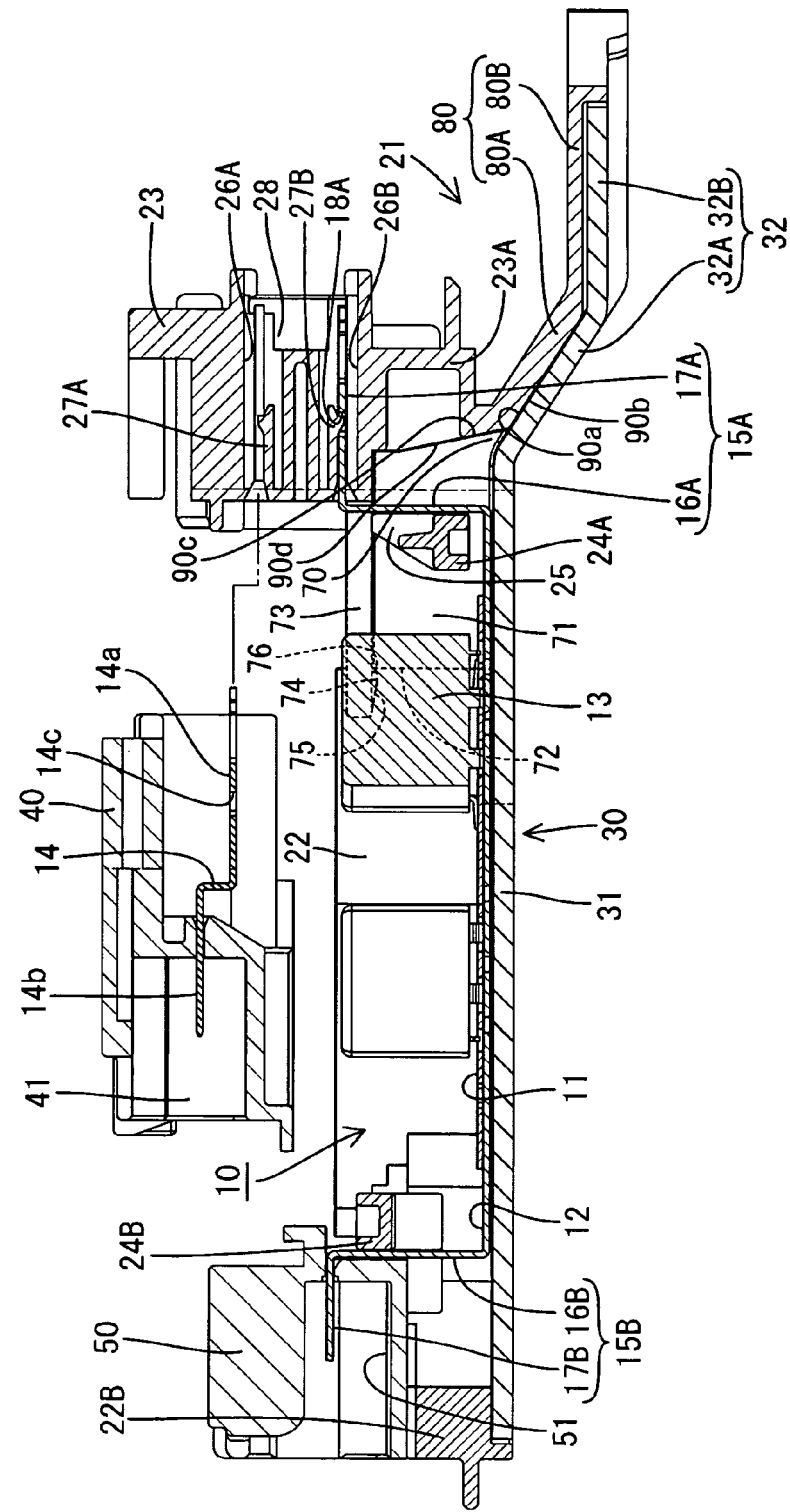
FIG. 11 is a sectional view depicting a state prior to incorporating a first connector housing to the second frame member.
Figure 12:
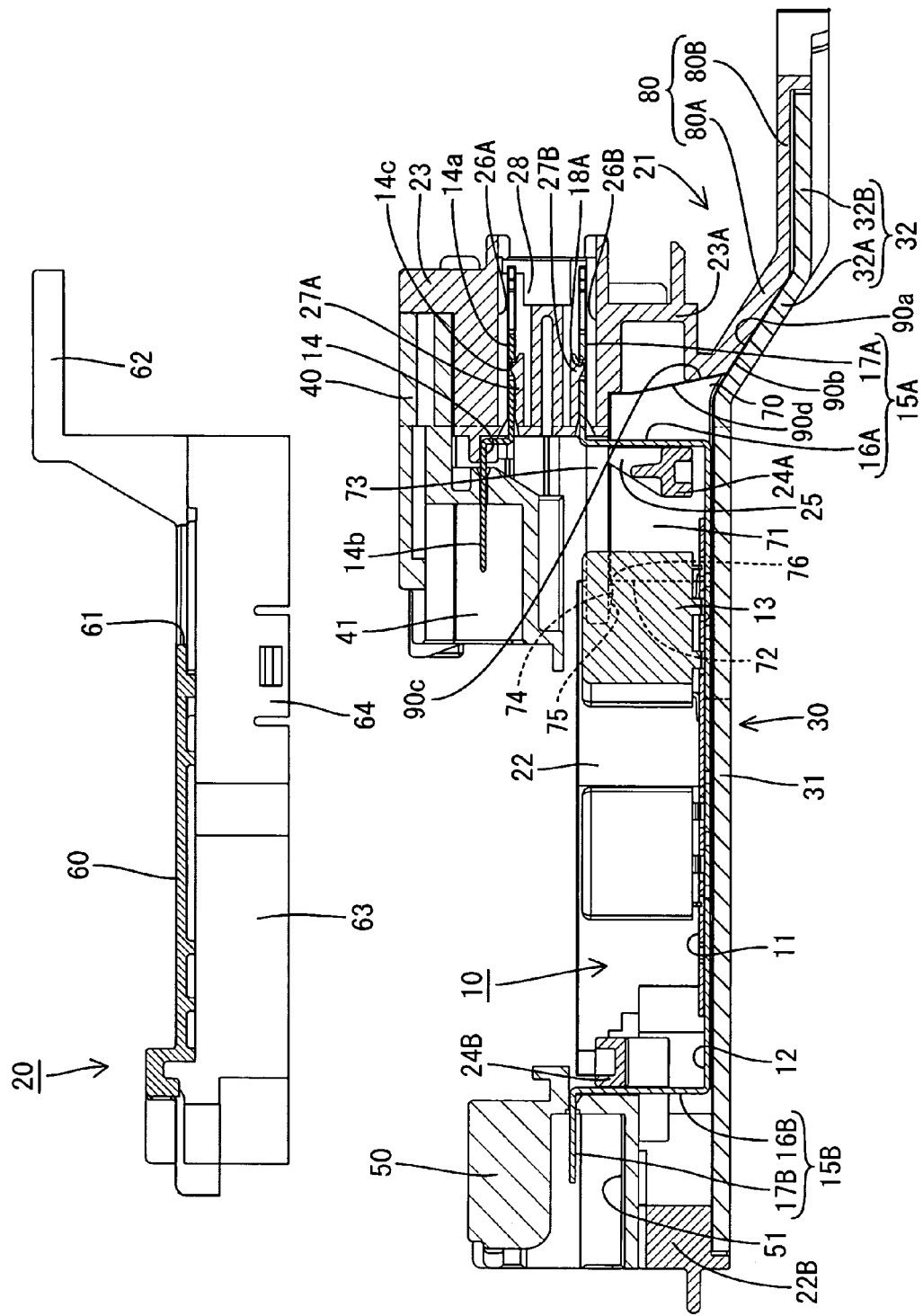
FIG. 12 is a sectional view depicting a state prior to incorporating a cover onto the frame.
Figure 13:
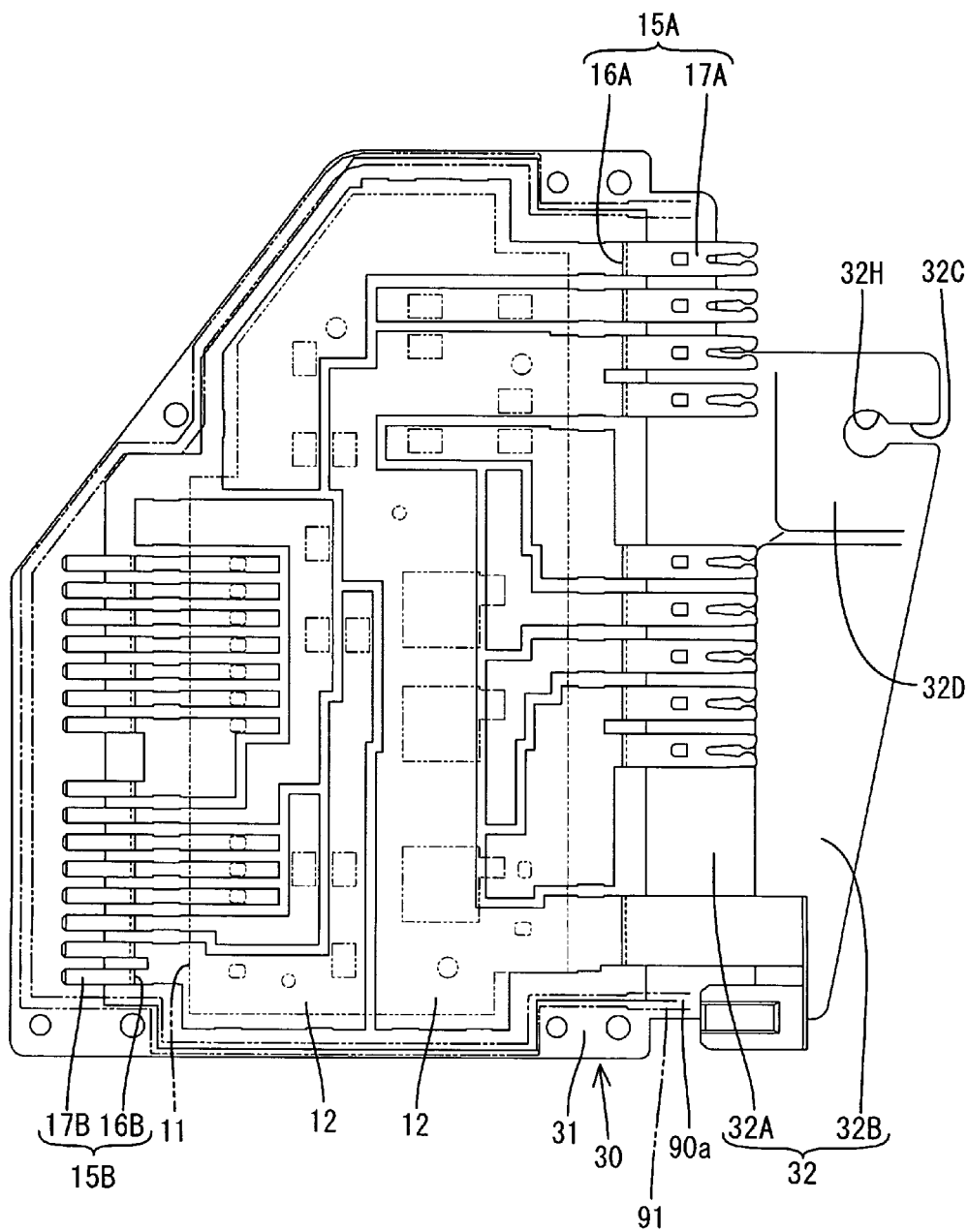
FIG. 13 is a plan view of the circuit structure.

Here, in the course of the process of incorporating the second frame member 23 onto the heat sink 30, the terminal parts 17A of the first terminal parts 15A are inserted into the cavities 26B on the rear side (see FIGS. 5 and 11). The portion 23A of the second frame member 23, closer to the rear surface and further away from the cavities 26B on the rear side, is placed into the space between the first terminal parts 15A and the heat sink 30 (i.e., the space closer to the rear side and further away from the first terminal parts 15A).

In addition, in the course of the process of incorporating the second frame member 23 with the heat sink 30, the guiding inclined surface 75 of the engaging protrusions 74, formed in the attachment pieces 73 of the second frame member 23, contacts the attachment stands 71 of the first frame member 22. While guiding is being performed by this guiding inclined surface 75, the engaging protrusions 74 slide upon the front surface of the attachment stands 71. The attachment pieces 73 distort to the front side. And, when the second frame member 23 is pushed further and moved further toward the bottom and the engaging protrusions 74 go over the attachment stands 71, the attachment pieces 73 return to the original orientations as a result of their elastic force. The displacement restraining surfaces 76 of the engaging protrusions 74 are then engaged with the engaging surfaces 72 of the attachment stands 71. Thus, the second frame member 23 is held in a condition restraining displacement toward the top, that is, in the direction opposite to the direction of incorporating the second frame member 23. The displacement is restrained while the sealing agent 91 dries for the first frame member 22, among at least the first sealing surface 90a, complementary sealing surface 90b, and the secondary sealing surface 90c, or while the second frame member 23 and the first frame member 22 are fixed with a screw. As described above, the frame 21 is configured in a state where the opening of the rear side is sealed in a liquid-tight state with the heat sink 30.

Thus, after the frame 21 has been configured to enclose the printed circuit board 11 over the entire circumference and the heat sink 30, covering the printed circuit board 11 and the bus bars 12 from the rear side, has been fixed to the frame 21, for the purpose of waterproofing a filling component (not shown in the drawing) is injected into the interior of the concave part configured by the frame 21 and the rear surface of the heat sink 30. The filling component covers regions excluding the first terminal parts 15A and the second terminal parts 15B of the bus bars 12 (i.e., that is, the bus bars 12 are disposed along the rear side of the printed circuit board 11), the printed circuit board 11 in its entirety, and the contact portions with the switching elements 13 in the printed circuit board 11. Thereby, the inundation of as well as presence of extraneous filling component is prevented from interfering with the conductive portions of the printed circuit board 11, the bus bars 12 and the switching elements 13.

Thereafter, the first connector housing 40 is incorporated with the second frame member 23. The fuse contact parts 14a of the terminal metals 14 are inserted into the cavities 26A on the front side so that engagement between the locking arm 23B and the locking protrusion 42 of the second frame member 23 locks the first connector housing 40 and the second frame member 23 into an incorporated condition. In addition, the operation of incorporating this first connector housing 40 takes place in tandem with the operation of incorporating the second connector housing 50 with the first frame member 22. Second terminal parts 15B are attached to the second connector housing 50 so that the second connector housing 50 and the first frame member 22 are brought into a locking condition in an incorporated state via screws (not shown in the drawing) (see FIGS. 6 and 12).

Lastly, the cover 60 is incorporated onto the frame 21 from the front side and is locked in an incorporated state due to engagement between the elastomeric engaging pieces 64 and the engagement protrusions 29. The cover 60, the first connector housing 40, and the second frame member 23, are further fixed together with the screws (not shown in the drawing) (see FIGS. 1 and 7). With this cover 60, the printed circuit board 11 and the switching elements 13 are enveloped and hidden.

As described above, in the present embodiment the frame 21 is in a two-component structure including a second frame member 23 disposed to the top side of the first terminal parts 15A and the first frame member 22 disposed along the regions of the periphery of the circuit board 11 not corresponding with the first terminal parts 15A. Therefore, the restraint is missing that the frame 21 must be incorporated onto the circuit structure 10, with the switching members 13 having been previously implemented, from the rear side prior to bonding with the heat sink 30. This allows the application of pressure to the circuit board 11 over a wide range prior to the implementation of the switching members 13, raising the feasibility of firm bonding of the bus bars 12 with the heat sink 30 over a wide range.

In addition, when the connecting end parts of the first frame member 22 to the second frame member 23 are free end parts, deformation about the free end parts, such as opening and closing, are a concern. However, in the present embodiment the connecting end parts of the first frame member 22 to the second frame member 23 are mutually connected with a bridge part 24A. Therefore, deformation of the first frame member 22 can be inhibited.

In addition, when the second frame member 23 is relatively fitted with the connecting parts 17A of the first terminal parts 15A, the lances 27B are brought into contact and give rise to a fitting resistance. Because of the pressing force generated from this fitting resistance, there is a concern that the first terminal parts 15A are deformed in such a manner as to cause the supporting parts 16A to abut against the side of the circuit board 11. However, in the present embodiment, the terminal supporting parts 25 are designed to accept the pressing force generated by the second frame member 23 (i.e., lances 27B). Therefore, deformation of the first terminal parts 15A can be prevented.

Moreover, the first sealing surface 90a of the heat sink 30 and the complementary sealing surface 90b of the second frame member 23 are configured to be inclined in the direction of incorporation of the second frame member 23 onto the heat sink 30. This restricts to a relatively small quantity the amount of the sealing agent 91 coated onto the first sealing surface 90a and removed due to friction of the second frame member 23. Accordingly, the layer of the sealing agent 91 in the gap between the first sealing surface 90a and the complementary sealing surface 90b does not become thin, but is held at a desired thickness. This gives rise to a condition that the sealing surfaces 90a and 90b have undergone an approximately uniform coating over their entire regions, thereby deriving a high sealing performance.

In addition, the first frame member 22 comprising the second sealing surface 90c, linked to the end edge (i.e., the bottom edge) of the front side in the approaching direction of the second frame member 23 on the first sealing surface 90a of this heat sink 30, is fixed onto the heat sink 30. A part of the sealing agent 91 coated onto the first sealing surface 90a is removed by friction of the second frame member 23 and is coated and fixed onto the second sealing surface 90c of the first frame member 22. The gap between the second frame member 23 and the first frame member 22 will be sealed with the sealing agent 91 on this second sealing surface 90c. That is, during incorporation of the second frame member 23 onto the heat sink 30, the sealing agent 91 is designed to be concurrently coated and fixed onto the second sealing surface 90c of the first frame member 22. Therefore there is no need to coat additional sealing agent 91 onto the third sealing surface 90d of the second frame member 23 and the second sealing surface 90c.

In addition, the second sealing surface 90c of the first frame member 22 is inclined in the direction of incorporating the second frame member 23 onto the heat sink 30, making an obtuse angle with the first sealing surface 90a of the heat sink 30. Therefore, the sealing agent 91, coated and fixed onto the second sealing surface 90c, is driven to the second frame member 23. Thereby, the sealing agent 91 is forced to expand in the direction of separation from the first sealing surface 90a. Accordingly, the sealing region between the first frame member 22 and the second frame member 23 becomes enlarged and the sealing performance in this sealing region is improved.

In addition, the displacement restraining surfaces 76 of the engaging protrusions 74 provided in the attachment pieces 73 of the second frame member 23 are brought into engagement with the engaging surfaces 72 of the attachment stands 71 of the first frame member 22, from the direction of the bottom. Thereby, displacement towards the top (i.e., the direction opposite to the direction of incorporation) of the second frame member 23 is restrained. As a result, the second frame member 23 is held in a state of being incorporated with the first frame member 22. This can prevent the sealing surfaces 90a, 90b, and 90c, from allowing unintended displacement and variations in the thickness of the layer of the sealing agent 91, which may otherwise result in a drop in the sealing performance, during the period until the drying is completed of the sealing agent 91, present between the first sealing surface 90a, the complementary sealing surface 90b, and the second sealing surface 90c.

The present invention is not to be limited to the embodiments described with the descriptions and drawings. Embodiments such as those described as follows, for example, are also included within the technical scope of the present invention.

(1) In the embodiments, the first frame member was provided with the bridge part 24A. However, the first frame member will still work well if provided with a corresponding amount of strength. As a result, the bridge part 24a is not indispensable.

(2) In the embodiment, the frame was configured using two components. However the frame may be configured by three or more components.

(3) In the embodiment, the bracket 32 of the heat sink 30 was provided with an inclined sealing surface. However, according to the present invention an inclined sealing surface may be provided in a portion (of the main plate body) other than the bracket of the heat sink.

(4) In the embodiment, the first frame member was incorporated onto the heat sink in a state in which the sealing agent was coated onto both of the first sealing surface and the second sealing surface. However, according to the present invention, the first frame member may be incorporated into the heat sink in a state that the sealing agent is coated onto only one of the first sealing surface and the second sealing surface.

(5) In the embodiment, the second frame member 23 is provided with engaging protrusions 74 for restraining the displacement in the direction opposite to the direction of incorporating the second frame member 23. However, according to the present invention the engaging protrusions do not have to be provided in the case where, for example, the first terminal parts are inserted into the cavities of the first frame member and engaged with the lances of the cavities, the first terminal parts are engaged to restrain displacement of the first frame member. Alternatively, for example, engaging protrusions do not have to be provided in the case where a retaining member, capable of retaining the first frame member and the second frame member in an incorporated state, is separately provided and thereby displacement of the first frame member is restrained and the like.

(6) In the embodiment, the engaging protrusions 74 are formed in attachment pieces 73 of the second frame member 23. However, according to the present invention engaging protrusions may be formed in the sides of the second frame member.

The invention claimed is:

1. An electric junction box comprising:
a circuit structure comprising:
   a circuit board;
   a circuit element disposed on a first surface of the circuit board; and
   a plurality of bus bars disposed on a second surface of the circuit board;
   wherein a portion of each of the plurality of bus bars extends beyond a periphery of the circuit board; and
   the portion comprises a terminal part;
a casing to enclose the circuit structure comprising:
   a plurality of cavities for accommodating the terminal parts;
   a heat sink bonded to a bus bar side of the circuit structure;
   a frame disposed so as to contact said heat sink and surround the circuit structure along the periphery of the circuit board; and
   a cover attachable to the frame from a side of the circuit structure opposite to the bus bar side;
   wherein the frame comprises:
     a first frame member disposed in a first region of the periphery of the circuit board; and
     a second frame member disposed in a second region of the periphery of the circuit board;
     wherein the first frame member is attached to the second frame member to substantially encompass the periphery of the circuit board;
     wherein the first frame member includes a contact surface that the second frame member contacts;
     wherein the contact surface is located adjacent to a first sealing surface;
     wherein at least a part of the contact surface comprises a second sealing surface;

wherein a sealing agent placed on the first sealing surface is moved during the incorporation of the first member with the second member so as to: (1) seal the second sealing surface, (2) limit an amount of the sealing agent to a small amount and (3) limit an amount of the sealing agent removed by friction when the second sealing surface is sealed with the first sealing surface resulting in a layer of the sealing agent being maintained at a required thickness, thereby achieving an enhanced sealing ability;

wherein the first sealing surface is located on the heat sink; and wherein the second sealing surface makes an obtuse angle with the heat sink and the direction of incorporation of the second frame member.

2. The electric junction box as described in claim 1 wherein the portion of each of the plurality of bus bars further comprises:

a rising part bent at substantially a right angle to a plane containing the circuit board; and the terminal part is in a tip of the rising part and bent at substantially a right angle to a plane containing the rising part;

wherein the terminal part is substantially parallel to the plane containing the circuit board and extends in a direction away from the circuit board.

3. The electric junction box as described in claim 2, wherein the first frame member comprises:

a first end;
a second end; and
a bridge part connecting the first end to the second end.

4. The electric junction box as described in claim 3, wherein the bridge part further comprises:

a terminal supporting part contacting the rising portion of each of the plurality of bus bars from a circuit board side.

5. The electric junction box as described in claim 4, wherein each of the first end and the second end of the first frame member further comprise:

attachment stands; and
wherein corresponding attachment pieces are provided in the second frame member;
wherein the first frame member is fixed to the second frame member via mechanical fasteners connecting the attachment stands to the corresponding attachment pieces.

6. The electric junction box as described in claim 1, wherein the first frame member comprises:

a first end;
a second end; and
a bridge part connecting the first end to the second end.

7. The electric junction box as described in claim 6, wherein the bridge part further comprises:

a terminal supporting part contacting the rising portion of each of the plurality of bus bars from a circuit board side.

8. The electric junction box as described in claim 7, wherein each of the first end and the second end of the first frame member further comprises:

attachment stands; and
wherein corresponding attachment pieces are provided in the second frame member;
wherein the first frame member is fixed to the second frame member via mechanical fasteners connecting the attachment stands to the corresponding attachment pieces.

9. An electric junction box comprising:
a circuit structure with a circuit element being implemented on a circuit board;
a casing enclosing the circuit structure comprising:
a heat sink bonded to the circuit structure;
a frame having a contact surface in contact to this heat sink and disposed so as to surround the circuit structure; and
a cover contacting the frame on a side opposite to a side of the heat sink, wherein the circuit structure is covered; and
wherein the frame further comprises:
a first frame member fixed to the heat sink; and
a second frame member incorporated with the first frame member by incorporation from a direction parallel to a plane containing the circuit board;
wherein the first frame member includes a contact surface that the second frame member contacts;
wherein the contact surface is located adjacent to a first sealing surface;
wherein at least a part of the contact surface comprises a second sealing surface;
wherein a sealing agent placed on the first sealing surface is moved during the incorporation of the first member with the second member so as to: (1) seal the second sealing surface, (2) limit an amount of the sealing agent to a small amount and (3) limit an amount of the sealing agent removed by friction when the second sealing surface is sealed with the first sealing surface resulting in a layer of the sealing agent being maintained at a required thickness, thereby achieving an enhanced sealing ability;
wherein the first sealing surface is located on the heat sink; and
wherein the second sealing surface makes an obtuse angle with the heat sink and the direction of incorporation of the second frame member.

10. The electric junction box described in claim 9, wherein at least one of the first frame member or the second frame member is provided with an engaging part that when brought into engagement with an other of the first frame member or the second frame member, restrains displacement of the first frame member relative to the second frame member in a direction opposite to the direction of incorporation.

11. An electric junction box comprising:
a circuit structure comprising:
a circuit board;
a circuit element being implemented on a surface of the circuit board; and
one or more bus bars extending outward away from a periphery of the circuit board, and being disposed on an other surface of the circuit board,
wherein each of the one or more bus bars comprises:
a portion extending from the periphery of the circuit board, wherein a terminal part is formed in the portion;
casing to enclose the circuit structure, comprising:
a heat sink bonded to the circuit structure;
a frame disposed so as to contact this heat sink and surround the circuit structure; and
a cover removably attached to the frame;
wherein the frame comprises:
a first frame member disposed along a first peripheral region of the circuit board and fixed to the heat sink; and
a second frame member disposed along a second peripheral region of the circuit board;
wherein the second frame member is incorporated into the first frame member by incorporation from a direction parallel to a plane containing the circuit board;
wherein the first frame member comprises a contact surface that the second frame member contacts; and wherein the contact surface is located adjacent to a first sealing surface;

wherein at least a part of the contact surface comprises a second sealing surface;

wherein a sealing agent placed on the first sealing surface is moved during the incorporation of the first member with the second member so as to: (1) seal the second sealing surface, (2) limit an amount of the sealing agent to a small amount and (3) limit an amount of the sealing agent removed by friction when the second sealing surface is sealed with the first sealing surface resulting in a layer of the sealing agent being maintained at a required thickness, thereby achieving an enhanced sealing ability;

wherein the first sealing surface is located on the heat sink; and wherein the second sealing surface makes an obtuse angle with the heat sink and the direction of incorporation of the second frame member.

12. The electric junction box described in claim 11, wherein at least one of the first frame member or the second frame member is provided with an engaging part that when brought into engagement with an other of the first frame member or the second frame member, restrains displacement of the first frame member relative to the second frame member in a direction opposite to the direction of incorporation.

13. The electric junction box as described in claim 12, wherein the first frame member is composed of one or more frame member sections.

* * * * *

UNITED STATES PATENT AND TRADEMARK OFFICE
CERTIFICATE OF CORRECTION

PATENT NO. : 7,632,110 B2 Page 1 of 1
APPLICATION NO. : 11/791746
DATED : December 15, 2009
INVENTOR(S) : Tomoki Kanou et al.

It is certified that error appears in the above-identified patent and that said Letters Patent is hereby corrected as shown below:

On title page
Please delete the following:

Item "(87)    PCT Pub. No.:    WO2006/057156
              PCT Pub. Date:   Jan. 6, 2006"

And replace with:

Item (87)     PCT Pub. No.:    WO2006/057156
              PCT Pub. Date:   June 1, 2006

Signed and Sealed this

Sixteenth Day of March, 2010

David J. Kappos
*Director of the United States Patent and Trademark Office*